United States Patent
Ohashi et al.

(10) Patent No.: US 9,173,246 B2
(45) Date of Patent: Oct. 27, 2015

(54) INFORMATION MANAGEMENT SYSTEM, WIRELESS TERMINAL, AND MANAGEMENT METHOD

(71) Applicants: Yasuo Ohashi, Kanagawa (JP); Michitaka Fukuda, Kanagawa (JP); Shin Kusakari, Kanagawa (JP); Seiji Miyawaki, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP); Yusuke Matsushita, Kanagawa (JP)

(72) Inventors: Yasuo Ohashi, Kanagawa (JP); Michitaka Fukuda, Kanagawa (JP); Shin Kusakari, Kanagawa (JP); Seiji Miyawaki, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP); Yusuke Matsushita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 148 days.

(21) Appl. No.: 14/023,910

(22) Filed: Sep. 11, 2013

(65) Prior Publication Data

US 2014/0071853 A1    Mar. 13, 2014

(30) Foreign Application Priority Data

Sep. 12, 2012  (JP) ................................. 2012-200642
Sep. 3, 2013   (JP) ................................. 2013-182176

(51) Int. Cl.
  *H04W 88/04*    (2009.01)
  *H04W 4/02*     (2009.01)
  *H04W 52/02*    (2009.01)

(52) U.S. Cl.
  CPC ............... *H04W 88/04* (2013.01); *H04W 4/02* (2013.01); *H04W 52/0206* (2013.01); *H04W 52/0219* (2013.01); *H04W 52/0245* (2013.01); *H04W 4/021* (2013.01)

(58) Field of Classification Search
  None
  See application file for complete search history.

(56) References Cited

U.S. PATENT DOCUMENTS 6,292,747 B1 * 9/2001 Amro et al. ................... 701/487
8,280,398 B2   10/2012 Ishii et al.

(Continued)

FOREIGN PATENT DOCUMENTS

JP    2005-158007    6/2005
JP    2010-159980    7/2010

(Continued)

OTHER PUBLICATIONS

U.S. Appl. No. 13/784,961, filed Mar. 5, 2013.

(Continued)

*Primary Examiner* — Min Jung
(74) *Attorney, Agent, or Firm* — Oblon, McClelland, Maier & Neustadt, L.L.P.

(57) ABSTRACT

An information management system is disclosed that includes a wireless terminal configured to store identification data of the wireless terminal used to identify the wireless terminal in the system; a broadcasting device configured to transmit position data which represents a position at which the device is located for a predetermined area; and a server configured to store position data indicating a position at which the terminal is located. The terminal includes a collection unit configured to collect environmental data which represents a state of an environment around the terminal; a receiving unit configured to receive the position data from the device when the terminal is located in the predetermined area; and a transmission unit configured to transmit, via the device, to the server, the identification of the terminal, the position data received from the device, and the environmental data collected by the collection unit.

8 Claims, 19 Drawing Sheets

(56) References Cited

U.S. PATENT DOCUMENTS

| | | | |
|---|---|---|---|
| 2003/0203730 A1* | 10/2003 | Wan et al. | 455/404.2 |
| 2006/0181411 A1* | 8/2006 | Fast et al. | 340/539.13 |
| 2008/0137589 A1* | 6/2008 | Barrett | 370/327 |
| 2011/0301839 A1* | 12/2011 | Pudar et al. | 701/202 |
| 2012/0068822 A1* | 3/2012 | Sheikman et al. | 340/7.2 |
| 2014/0045482 A1* | 2/2014 | Bisson et al. | 455/420 |
| 2014/0080514 A1* | 3/2014 | Das et al. | 455/456.1 |

FOREIGN PATENT DOCUMENTS

| | | |
|---|---|---|
| JP | 4620410 | 1/2011 |
| JP | 2012-098901 | 5/2012 |
| WO | 2005/086375 | 9/2005 |

OTHER PUBLICATIONS

U.S. Appl. No. 13/795,383, filed Mar. 12, 2013.

* cited by examiner

FIG.4

| FLOOR NUMBER | LATITUDE | LONGITUDE | BUILDING NUMBER |
|---|---|---|---|
| 16 | 35.459555 | 139.387110 | C |

FIG.5

| FLOOR NUMBER | LATITUDE | LONGITUDE | BUILDING NUMBER |
|---|---|---|---|
| 16 | 35.459555 | 139.387110 | C |

FIG.6

| FLOOR NUMBER 9bit | LATITUDE 21bit | LONGITUDE 21bit | BUILDING NUMBER 8bit |
|---|---|---|---|

FIG.7

| IDENTIFICATION | LATITUDE | LONGITUDE | FLOOR NUMBER | BUILDING NUMBER | RECEIPT DATE AND TIME | OBJECT NAME | OWNER DIVISION |
|---|---|---|---|---|---|---|---|
| 002673abcdef01 | 35.459555 | 139.387110 | 16 | C | 11/12/12 13:30:01 | PJ WX4310 | BUSINESS SECTION 1 |
| 002673abcdef02 | 35.459483 | 139.388437 | 4 | A | 11/12/12 13:30:03 | UCS P3000 | BUSINESS SECTION 1 |
| .. | .. | .. | .. | .. | .. | .. | |
| .. | .. | .. | .. | .. | .. | .. | |

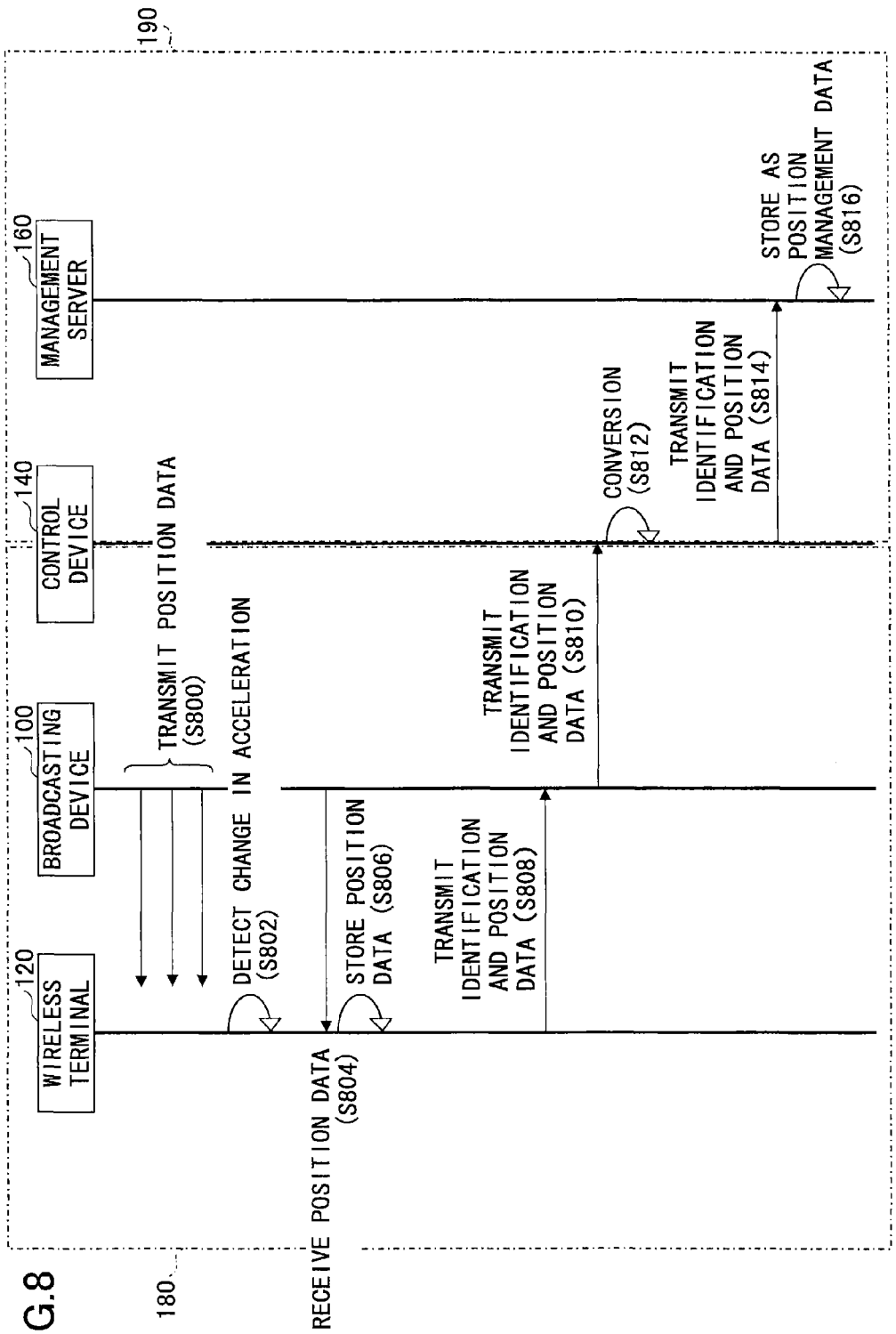

FIG.9A

| LOCATION SEARCH SYSTEM | |
|---|---|
| OWNER DIVISION | OBJECT NAME |
| BUSINESS SECTION 1 | PJ WX4310 |
| | UCS P3000 |
| | .. |
| | .. |
| BUSINESS SECTION 2 | PJ WX3231N No.1 |
| | PJ WX3231N No.2 |
| | PJ WX3231N No.3 |

QUERY

FIG.12

| TEMPERATURE (DEGREES CELSIUS) | HUMIDITY (%) | ILLUMINANCE (lx) | ODOR (INDEX) | HUMAN-DETECTING (0/1) | AIR PRESSURE (hPa) | CONTACT (0/1) | RADIATION (Sv) | ACOUSTIC (dB) | ELECTROMAGNETIC (dBm) |
|---|---|---|---|---|---|---|---|---|---|
| 25 | 50 | 50 | 10 | 0 | 1020 | 0 | 0.001 | 60 | −50 |

| IDENTIFICATION | LATITUDE | LONGITUDE | FLOOR NUMBER | BUILDING NUMBER | RECEIPT DATE AND TIME | OBJECT NAME | OWNER DIVISION |
|---|---|---|---|---|---|---|---|
| 002673abcdef01 | 35.459555 | 139.387110 | 16 | C | 2011/12/12 13:30 | PJ WX4310 | BUSINESS SECTION 1 |
| 002673abcdef02 | 35.459483 | 139.388437 | 4 | A | 2011/12/12 13:30 | UCS P3000 | |
| .. | .. | .. | .. | .. | .. | .. | .. |

| TEMPERATURE (DEGREES CELSIUS) | HUMIDITY (%) | ILLUMI-NANCE (lx) | ODOR (INDEX) | HUMAN-DETECTING (0/1) | AIR PRESSURE (hPa) | CONTACT (0/1) | RADIATION (Sv) | ACOUSTIC (dB) | ELECTRO-MAGNETIC (dBm) |
|---|---|---|---|---|---|---|---|---|---|
| 25 | 50 | 50 | 10 | 0 | 1020 | 0 | 0.001 | 60 | -50 |
| 24 | 45 | 100 | 9 | 1 | 1020 | 0 | 0.001 | 50 | -50 |
| .. | .. | .. | .. | .. | .. | .. | .. | .. | .. |

INFORMATION MANAGEMENT SYSTEM, WIRELESS TERMINAL, AND MANAGEMENT METHOD

BACKGROUND OF THE INVENTION

1. Field of the Invention

An aspect of this disclosure is related to an information management system, a wireless terminal, and a management method.

2. Description of the Related Art

Conventionally, an environment management system is proposed for managing or monitoring an environment by measuring or managing data (e.g. temperature or humidity) about the environment.

Patent Document 1 shows an environment monitoring system which obtains the environmental value measured by some kinds of sensors attached to moving objects. The environment management system may collect, store, manage, and provide the environmental values in some locations without installing fixed sensors, and may monitor the environment while holding the accuracy of the values in a certain level or higher.

However, in the environment management system disclosed in Patent Document 1, a general wireless communication method is expected for communications between the sensors and the monitoring device. Thus, power consumption of the communications for the sensors may be high.

An aspect of this disclosure aims to provide an information management system which may efficiently manage environmental data.

SUMMARY OF THE INVENTION

In an aspect of this disclosure, there is provided an information management system, the information management system including a wireless terminal configured to store identification data of the wireless terminal used to identify the wireless terminal in the information management system; a broadcasting device configured to transmit position data which represents a position at which the broadcasting device is located for a predetermined area; and a management server configured to store position data indicating a position at which the wireless terminal is located. The wireless terminal includes an environmental data collection unit configured to collect environmental data which represents a state of an environment around the wireless terminal; a first position data receiving unit configured to receive the position data from the broadcasting device when the wireless terminal is located in the predetermined area; and a first terminal data transmission unit configured to transmit, via the broadcasting device, to the management server, the identification of the wireless terminal, the position data received from the broadcasting device, and the environmental data collected by the environmental data collection unit.

According to another embodiment of this invention, there is provided a wireless terminal, communicating with a broadcasting device transmitting position data which represents a position at which the broadcasting device is located for a predetermined area and stores identification data used to identify the wireless terminal, the wireless terminal including an environmental data collection unit configured to collect environmental data which represents a state of an environment around the wireless terminal; a position data receiving unit configured to receive the position data from the broadcasting device when the wireless terminal is located in the predetermined area; and a terminal data transmission unit configured to transmit, via the broadcasting device, to a management server, the identification of the wireless terminal, the position data received from the broadcasting device, and the environmental data collected by the environmental data collection unit.

According to another embodiment of this invention, there is provided a management method executed on a wireless terminal in an information management system including the wireless terminal storing identification data used to identify the wireless terminal in the information management system, a broadcasting device transmitting position data which represents a position at which the broadcasting device is located for a predetermined area, and a management server storing position data indicating a position at which the wireless terminal is located, the management method including collecting environmental data which represents a state of an environment around the wireless terminal; receiving the position data from the broadcasting device when the wireless terminal is located in the predetermined area; and transmitting, via the broadcasting device, to the management server, the identification of the wireless terminal, the position data received from the broadcasting device, and the environmental data collected in the collecting.

According to an embodiment of this invention, the information management system may be provided to manage environmental data efficiently.

BRIEF DESCRIPTION OF THE DRAWINGS

Other objects and further features of embodiments may become apparent from the following detailed description when read in conjunction with the accompanying drawings, in which:

FIG. 4 is a drawing illustrating exemplary data stored on a broadcasting device according to an embodiment of this invention;

FIG. 5 is a drawing illustrating exemplary data stored on a wireless terminal according to an embodiment of this invention;

FIG. 6 is a drawing illustrating an exemplary format for position data transmitted by a wireless terminal according to an embodiment of this invention;

FIG. 7 is a drawing illustrating exemplary data stored on a management server according to an embodiment of this invention;

FIG. 8 is a sequence chart illustrating a process performed by a position data management system according to an embodiment of this invention;

FIG. 9A is a drawing illustrating an exemplary search screen displayed by a management server according to an embodiment of this invention;

FIG. 12 is a drawing illustrating an example of environmental data in a variant of this invention;

FIG. 13 is a drawing illustrating another example of position management data in a variant of this invention;

DESCRIPTION OF THE PREFERRED EMBODIMENTS

Figure 1A:
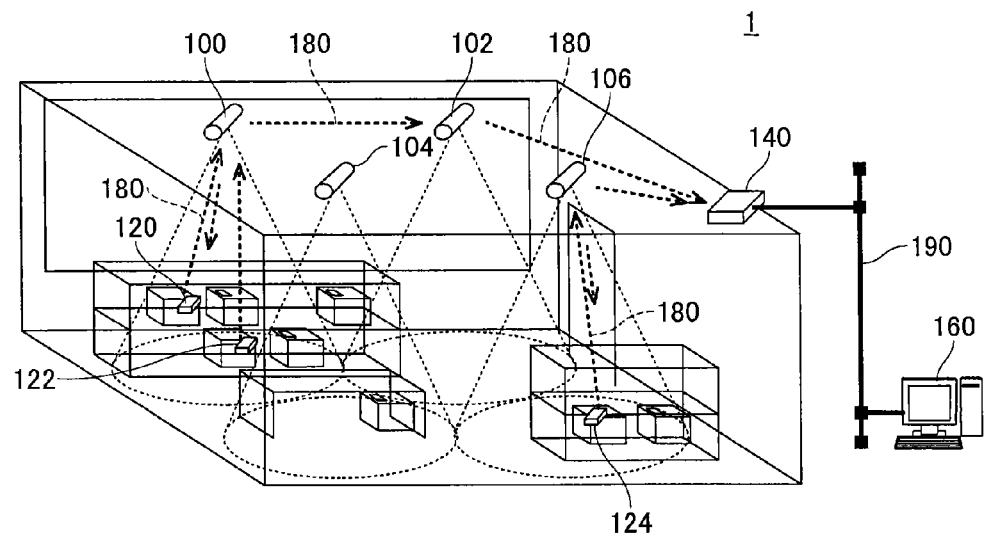
FIG. 1A is a drawing illustrating an overview of a position data management system (first example) according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. System Overview
2. Hardware Configurations
3. Functions
4. Process Flow (1. System Overview)

FIG. 1A is a drawing illustrating an overview of a position data management system (first example) according to an embodiment of this invention. The position data management system 1 shown in FIG. 1A includes broadcasting devices 100, 102, 104, 106, wireless terminals 120, 122, 124, a control device 140, a management server 160, a network 180 formed by the broadcasting devices, the wireless terminals, and the control device, and a network 190. The network 180 is a wireless network controlled by the control device 140.

Figure 1B:
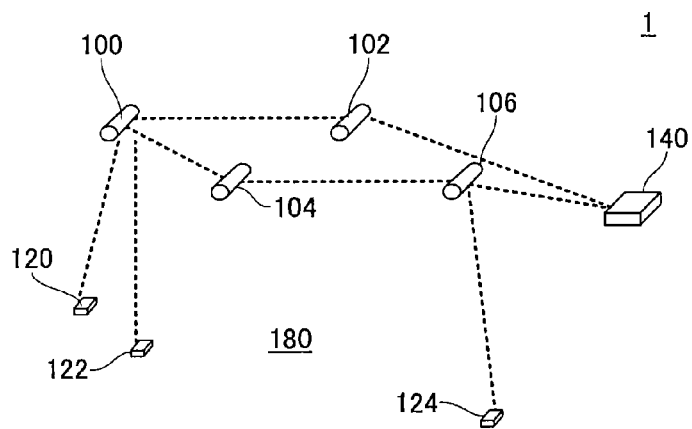
FIG. 1B is a drawing illustrating a network forming a position data management system according to an embodiment of this invention.

FIG. 1B shows only the broadcasting devices 100, 102, 104, 106, the wireless terminal 120, 122, 124, the control device 140 forming the wireless network 180 which are presented in FIG. 1A.

The broadcasting devices 100, 102, 104, 106 may be installed on the ceiling of a room, and continuously or intermittently transmit position data representing a position at which the broadcasting devices are installed. The position data may be expressed by degrees of latitude and longitude, a floor number and a building number. The broadcasting devices 100, 102, 104, 106 may have individual chassis, and may operate with power provided by an existing power source. Alternatively, the broadcasting devices 100, 102, 104, 106 may be incorporated in lighting apparatuses (e.g. a LED fluorescent tube) and may operate with power provided by the lighting apparatuses. The broadcasting devices 100, 102, 104, 106 may transmit the position data for a certain area with radio signals. The certain area may be given according to signal strength of the radio signals. The broadcasting devices 100, 102, 104, 106 are placed so that they cover a region to be covered for position management and each of the areas that the radio signals reach do not overlap. Alternatively, if the areas overlap, a receiving device of the position data (i.e. wireless terminals 120, 122, 124) may specify one of the broadcasting devices by comparing the strength of the received radio signals. As shown in FIG. 1A, dashed lines drawn under each broadcasting device shows certain areas. For example, the Indoor Messaging System (IMES) may be used to transmit the position data.

The wireless terminals 120, 122, 124 may receive the radio signals transmitted by the nearest broadcasting device of the broadcasting devices 100, 102, 104, 106. In an example shown in FIG. 1A, wireless terminals 120, 122, 124 are attached to managed objects whose locations are managed. The wireless terminals 120, 122, 124 may be active tags which may transmit radio signals. The wireless terminal 120 is used to explain the example below.

The wireless terminal 120 may receive the radio signal and the position data from the broadcasting device 100. The wireless terminal 120 may receive the position data according to the IMES standard. The wireless terminal 120 may transmit the received position data as well as identification such as a network address to the broadcasting device 100. The wireless terminal 120 may transmit the position data and the identification via the network 180 using a wireless communication method for a short range according to IEEE 802.15.4 and ZigBee™ standards. In this case, the identification may be expressed by a short address defined in IEEE 802.15.4 or an IEEE extended address (i.e. a MAC address) for the wireless terminal 120. The identification and the position data, which are transmitted to the broadcasting device 100, may be conveyed to the control device 140 via the neighboring broadcasting device 102. The wireless terminal 120 may transmit the identification and the position data at scheduled times or when an acceleration sensor included in the wireless terminal 120 detects a change in acceleration.

The control device 140 may be a gateway which interconnects the network 180 and the network 190, and may convert and relay data transmitted from the network 180 to the network 190. The control device 140 may be installed on a floor of a building or in a room separated by walls. For example, the control device 140 may mutually convert the data formats between the network 180 such as a personal area network (PAN) according to the IEEE 802.15.4 and the ZigBee™ standards and the network 190 such as a local area network (LAN) according to the IEEE 802.3 standard. In addition, when the identification of the wireless terminal 120 is expressed by the short address, the control device 140 may convert the short address into the IEEE extended address based on information about the PAN configuration and transmit it to the management server 160.

The management server 160 may store the identification and the position data received via the control device 140 with the receipt date and time, and may manage the position at which the broadcasting device 120 is located. The management server 160 may also manage information about the managed objects associated with the wireless terminals. Thus, the management server 160 may search the location where the managed objects exist.

The network 180 may be a PAN, which conforms to the IEEE 802.15.4 and ZigBee™ standards, connecting the broadcasting devices 100, 102, 104, 106, the wireless terminals 120, 122, 124, and the control device 140. When the PAN is formed conforming to the IEEE 802.15.4 and ZigBee™ standards, the wireless terminals 120, 122, 124 may work as ZigBee End Devices, the broadcasting devices 100, 102, 104, 106 may work as ZigBee Routers, and the control device 140 may work as a ZigBee Coordinator defined in the ZigBee™ standard. The broadcasting devices 100, 102, 104, 106 and the wireless terminals 120, 122, 124 may participate in the PAN on their start-up, and each route from each device or terminal to the control device may be specified.

The network 190 may be a LAN, which conforms to the IEEE 802.3 standard, connecting the control device 140 with the management server 160.

In the position data management system 1 according to the embodiment of this invention, the wireless terminals 120, 122, 124 may transmit the identification and the position data to the management server 160 with the minimum power for emitting the radio signals to reach the nearest broadcasting devices 100, 102, 104, 106. In addition, by implementing the broadcasting devices 100, 102, 104, 106 in the lighting apparatus, a cost may be reduced for introducing an infrastructure including the broadcasting devices which have the individual chassis.

The position data of the broadcasting devices 100, 102, 104, 106 may be broadcast via the network 180. Such an implementation may eliminate the need for transmitting the radio signals according to the IMES standard.

The wireless terminal 120 may transmit the identification and the position data to the control device 140 directly if the control device 140 locates nearer than the broadcasting device 100. In this case, the wireless terminal 120 may transmit the identification and the position data with the shortest path.

In addition, the control device 140 may be incorporated into the management server 160. Such an implementation may eliminate the need for the control device 140 having an individual chassis.

The wireless terminal 120 may be a smartphone, a personal digital assistant (PDA), a PC, or a smart indicator, which has functions equivalent to the active tag. With this implementation, the management server 160 may manage the position of the existing wireless terminals such as a smartphone.

The position data may include data for specifying the position in detail such as a partition in the room. That allows for more detailed management for the position data.

The managed objects may be people. That allows the information management system 1 to track the people.

The network 190 may be formed according to any short range wireless communication methods such as Bluetooth LE™, ANT, or Z-Wave. That allows the information management system 1 to support various kinds of the wireless terminals.

The network 190 may include various kinds of networks such as the Internet. That allows the information management system 1 to manage the position data of the wireless terminals 120, 122, 124 regardless of the physical distance between the network 180 and the management server 160.

Figure 1C:
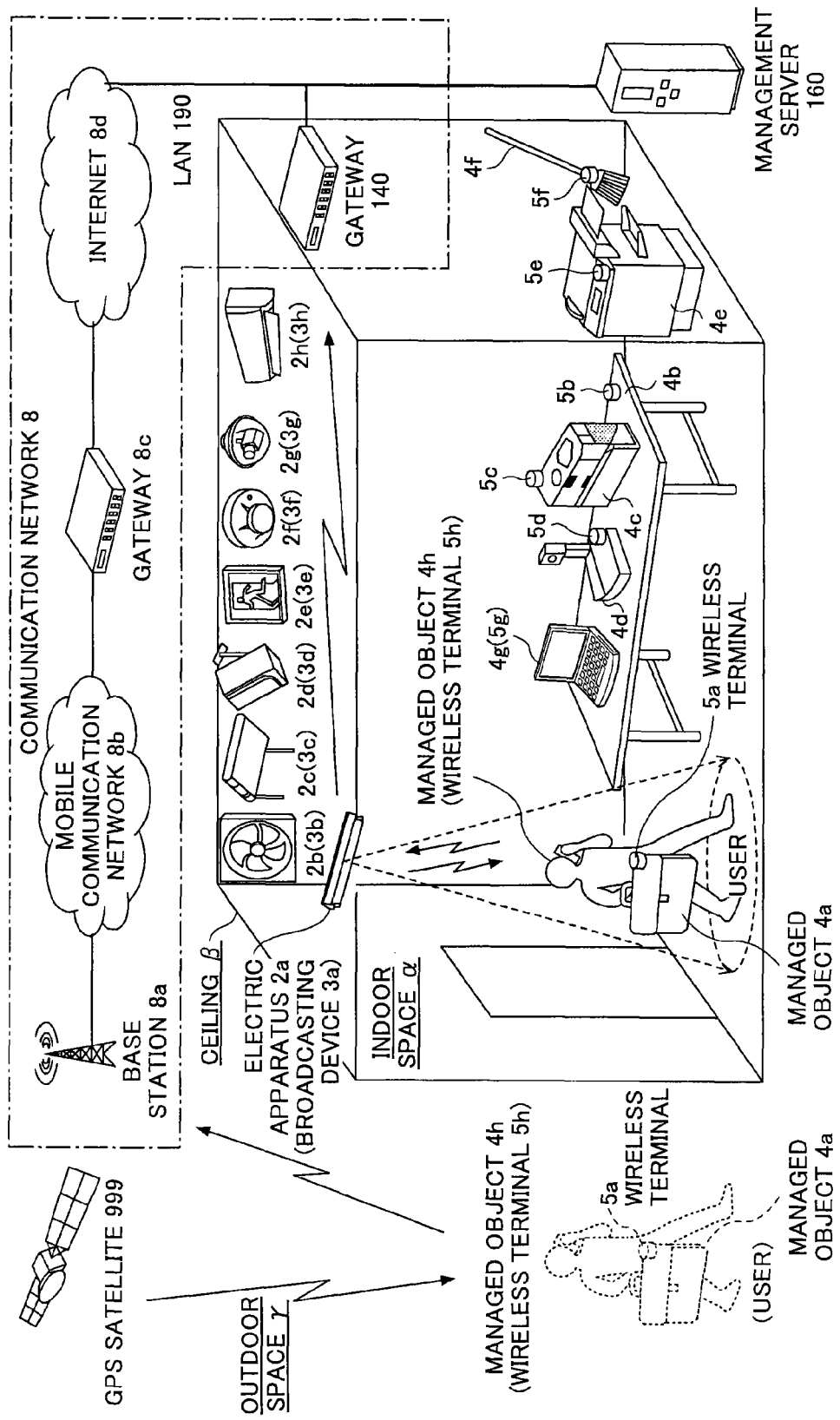
FIG. 1C is a drawing illustrating an overview of a position data management system (second example) according to an embodiment of this invention.

FIG. 1C is a drawing illustrating an overview of a position data management system (second example) according to an embodiment of this invention. In the FIG. 1C, some parts discussed below are attached to the position data management system 1 compared to the configuration shown in FIG. 1A.

As illustrated in FIG. 1C, the position data management system 1 includes a plurality of broadcasting devices 3a, 3b, 3c, 3d, 3e, 3f, 3g, and 3h provided on or near a ceiling β of an indoor space (or area) α, a plurality of wireless terminals 5a, 5b, 5c, 5d, 5e, 5f, 5g, and 5h on or near a floor of the indoor space α, and a management server 160.

Each of the broadcasting devices 3a, 3b, 3c, 3d, 3e, 3f, 3g, and 3h stores position data Xa, Xb, Xc, Xd, Xe, Xf, Xg, or Xh indicating a position where it is installed, and broadcasts the corresponding position data toward the floor of the indoor space α. Each of the broadcasting devices 3a, 3b, 3c, 3d, 3e, 3f, 3g, and 3h also stores device identification Ba, Bb, Bc, Bd, Be, Bf, Bg, or Bh for identifying itself.

Each of the wireless terminals 5a, 5b, 5c, 5d, 5e, 5f, 5g, and 5h stores the identification Aa, Ab, Ac, Ad, Ae, Af, Ag, or Ah for identifying itself. Hereafter, "identification A" may be used as a generic term to refer to the terminal identification Aa, Ab, Ac, Ad, Ae, Af, Ag, or Ah. The identification A may be a MAC address. When receiving the position data X from the broadcasting device 3, the wireless terminal 5 transmits its identification A together with the position data X to the broadcasting device 3.

The broadcasting devices 3 are included in or attached to corresponding electric apparatuses 2a, 2b, 2c, 2d, 2e, 2f, 2g, and 2h installed on the ceiling β of the indoor space β. Hereafter, "electric apparatus 2" may be used as a generic term to refer to any one of the electric apparatuses 2a, 2b, 2c, 2d, 2e, 2f, 2g, and 2h.

The electric apparatuses 2 supply power to the corresponding broadcasting devices 3. The electric apparatus 2a is a fluorescent-type light-emitting diode (LED) lighting apparatus. The electric apparatus 2b is a ventilation fan. The electric apparatus 2c is an access point of a wireless LAN. The electric apparatus 2d is a speaker. The electric apparatus 2e is an emergency light. The electric apparatus 2f is a fire alarm or a smoke alarm. The electric apparatus 2g is a security camera. The electric apparatus 2h is an air conditioner.

Any apparatus other than those illustrated in FIG. 1C may also be used as the electric apparatus 2 as long as it can supply power to the broadcasting device 3. For example, a lighting apparatus using a fluorescent lamp or a light bulb instead of LEDs and a security sensor for detecting intruders may also be used as the electric apparatuses 2.

The wireless terminals 5 are attached to managed objects 4a, 4b, 4c, 4d, 4e, and 4f whose positions are managed by the management server 160.

The managed object 4a is a bag. The managed object 4b is a table. The managed object 4c is a projector. The managed object 4d is a videoconference terminal. The managed object 4e is a multifunction peripheral (MFP) including a copy function. The managed object 4f is a broom.

Meanwhile, a managed object 4g is a personal computer including a function of the wireless terminal 5. That is, the managed object 4g is also a wireless terminal 5g. A managed object 4h is a cell phone such as a smartphone including a function of the wireless terminal 5. Therefore, the managed object 4h is also a wireless terminal 5h. Hereafter, "managed object 4" may be used as a generic term to refer to any one of the managed objects 4a, 4b, 4c, 4d, 4e, 4f, 4g, and 4h.

Objects other than those illustrated in FIG. 1C may also be used as the managed objects 4. Other examples of managed objects 4 may include a facsimile machine, a scanner, a printer, a copier, an electronic blackboard, an air cleaner, a shredder, a vending machine, a wristwatch, a camera, a game machine, a wheelchair, and a medical device such as an endoscope.

An exemplary position data management method using the management server 160 is outlined below. For example, the broadcasting device 3a installed on the ceiling β of the indoor space α broadcasts the position data Xa indicating the position where the broadcasting device 3a is installed via wireless communications. The wireless terminal 5a, for example, receives the position data Xa. Next, the wireless terminal 5a transmits the identification Aa for identifying the wireless terminal 5a and the position data Xa to the broadcasting device 3a via wireless communications. In other words, the wireless terminal 5a sends back the position data Xa together with the identification Aa to the broadcasting device 3a.

The broadcasting device 3a receives the identification Aa and the position data Xa. Then, the broadcasting device 3a transmits the identification Aa and the position data Xa to the gateway 140 via wireless communications. The gateway 140 transmits the identification Aa and the position data Xa via a LAN 8e to the management server 160. The management server 160 receives and manages the identification Aa and the position data Xa. Accordingly, an administrator of the management server 160 can identify the position of the wireless terminal 5a (the managed object 4a) in the indoor space α.

In an outdoor space (or area) γ, as illustrated in FIG. 1C, the wireless terminals 5g and 5h (among the wireless terminals 5) can receive a radio signal (time information, orbit information, etc.) from a GPS satellite 999 and calculate their positions on the Earth based on the radio signal. The wireless terminals 5g and 5h can also transmit their identification Ag, Ah and position data Xg, Xh to the management server 160 using a 3G (3rd generation) or 4G (4th generation) mobile communication system via a base station 8a, a mobile communication network 8b, a gateway 8c, the Internet 8d, and the LAN 8e.

The base station 8a, the mobile communication network 8b, the gateway 8c, the Internet 8d, the network 190, and the gateway 140 constitute a communication network 8. Although at least three GPS satellites are necessary to measure the latitude and longitude on the Earth (or four GPS satellites to also measure the altitude), only one GPS satellite 999 is illustrated in FIG. 1C for brevity.

(2. Hardware Configurations)

Next, with reference to FIGS. 2A, 2B, 2C, 2D, hardware configurations are explained for the broadcasting device 100, the wireless terminal 120, the control device 140, and the management server 160 in the position data management system 1 according to an embodiment of this invention.

Figure 2A:
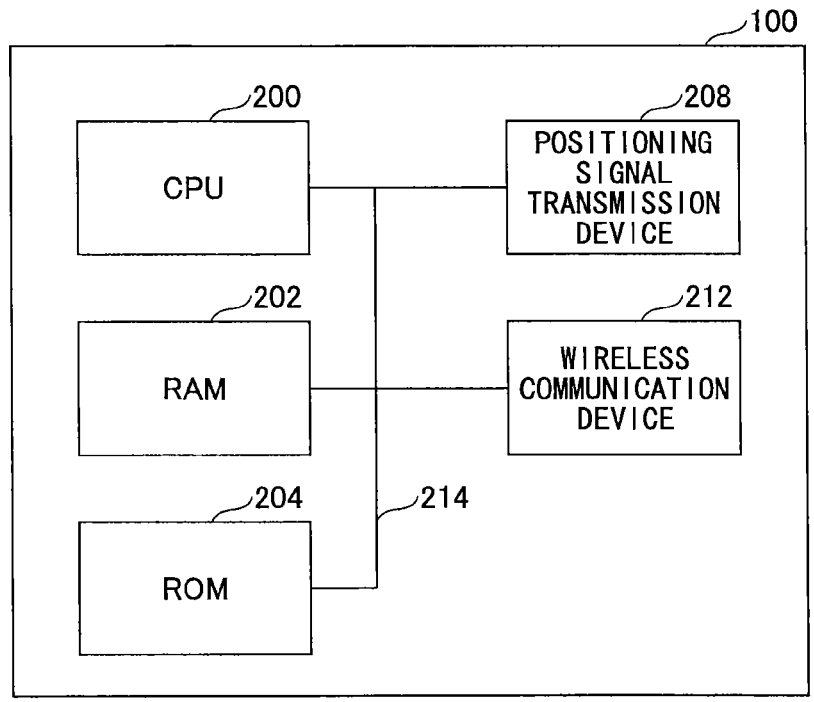
FIG. 2A is a block diagram illustrating an exemplary hardware configuration of a broadcasting device according to an embodiment of this invention.

FIG. 2A shows an exemplary hardware configuration of the broadcasting device 100 according to an embodiment of this invention. The broadcasting device 100 includes a CPU 200, a RAM 202, a ROM 204, a positional signal transmission device 208, a wireless communication device 212, and a bus 214.

The CPU 200 executes programs controlling the broadcasting device 100. The RAM 202 may operate as a working memory for the CPU 200. The ROM 204 stores programs executed by the CPU 100 as well as the position data of the broadcasting device 100. The positional signal transmission unit 208 emits the radio signal including the position data formed according to the IMES standard via an antenna(s). The wireless communication device 212 may transmit or receive radio waves conforming to the IEEE 802.15.14 standard via an antenna(s). The bus 214 interconnects the above devices electrically.

With the above configuration, the broadcasting device 100 may transmit the position data to the wireless terminal 120, receive the identification and the position data from the wireless terminal 120, and relay them to the management server 160 via the control device 140.

As stated above, if the position data is broadcast via the network 180, the positional signal transmission device 208 may be removed.

Figure 2B:
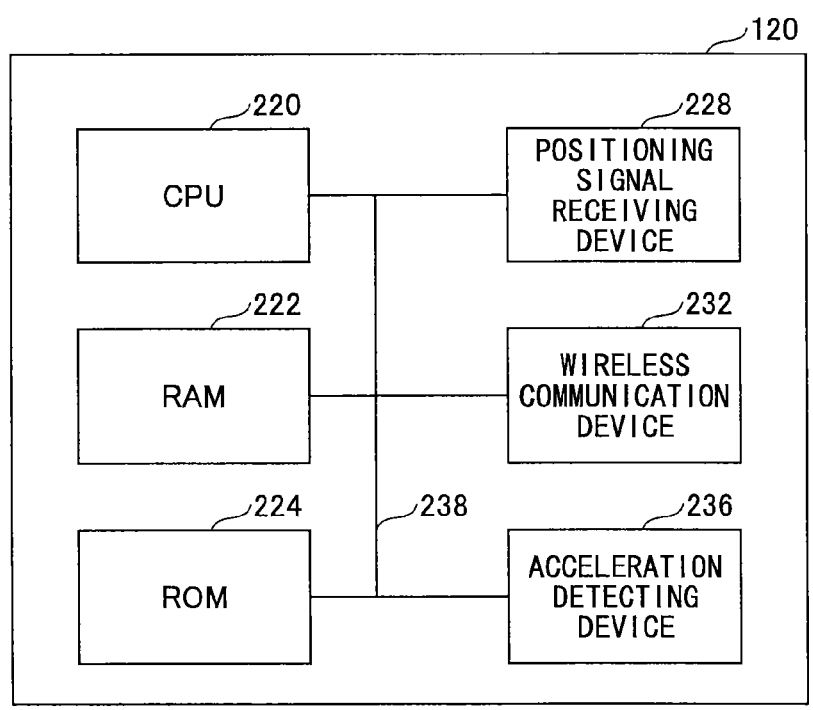
FIG. 2B is a block diagram illustrating an exemplary hardware configuration of a wireless terminal according to an embodiment of this invention.

FIG. 2B shows an exemplary hardware configuration of the wireless terminal 120 according to an embodiment of this invention. The wireless terminal 120 includes a CPU 220, a RAM 222, a ROM 224, a positioning signal receiving device 228, a wireless communication device 232, an acceleration detecting device 236, and a bus 238.

The CPU 220 executes programs controlling the wireless terminal 120. The RAM 222 may operate as a working memory for the CPU 220. The ROM 224 stores programs executed by the CPU 220 as well as the identification of the wireless terminal 120 and the position data received from the broadcasting device 100. The positioning signal receiving device 228 may receive the positioning signal representing the position data formed according to the IMES standard via an antenna(s). The communication device 232 may transmit or receive radio waves conforming to the IEEE 802.15.4 standard via an antenna(s). The acceleration detecting device 236 may be an acceleration sensor or a motion sensor detecting inertial force or magnetism, which may detect a change in acceleration. The bus 238 interconnects the above devices electrically.

With the above configuration, the wireless terminal 120 according to an embodiment of this invention may obtain the position data from the broadcasting device 100 and transmit the identification and the position data to the broadcasting device 100. In particular, the wireless terminal 120 may transmit the identification and the position data efficiently by detecting the movement of the wireless terminal and performing transmission or receiving actions.

When the wireless terminal 120 is the smartphone or PC, the wireless terminal 120 may additionally have input devices such as a touch panel, dial keys, a keyboard and/or a mouse. In addition, the wireless terminal 120 may have a display device such as a screen.

When the wireless terminal 120 has a GPS device including an antenna(s) and a control unit, the wireless terminal 120 may receive the positioning signal conforming to the IMES standard using the antenna(s). Thus, only a software update allows the wireless terminal 120 to join the position data management system 1.

The acceleration detecting device 236 may be removed. In that case, the wireless terminal 120 performs the transmission and receiving actions at predetermined intervals or times.

As stated above, the positional signal receiving device 228 may be removed when the position data is received via the network 180.

Figure 2C:
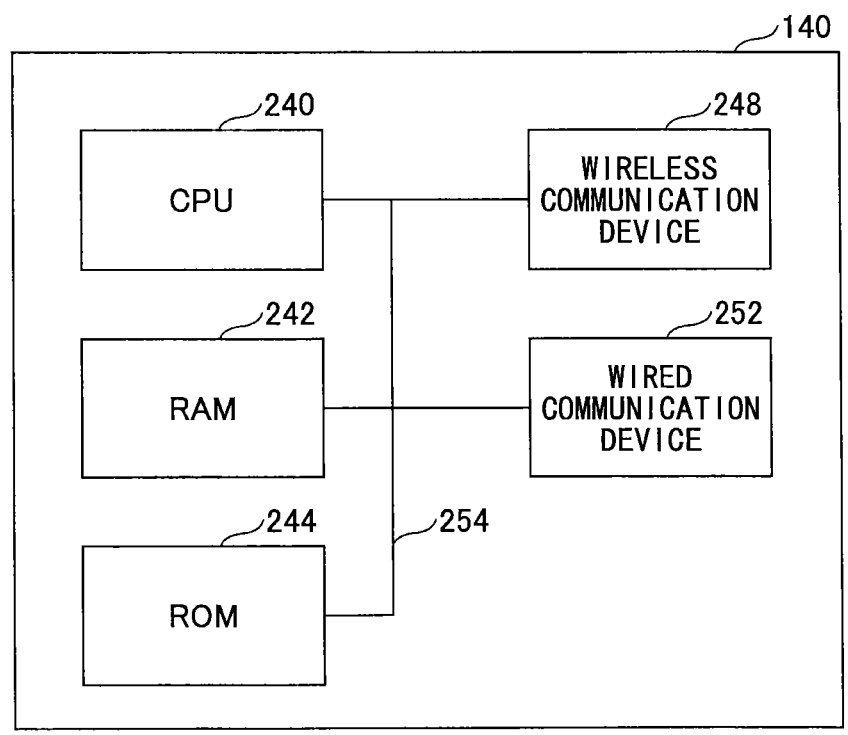
FIG. 2C is a block diagram illustrating an exemplary hardware configuration of a control device according to an embodiment of this invention.

FIG. 2C shows an exemplary hardware configuration of the control device 140 according to an embodiment of this invention. The control device 140 includes a CPU 240, a RAM 242, a ROM 244, a wireless communication device 248, a wired communication device 252, and a bus 254.

The CPU 240 executes programs controlling the control device 140. The RAM 242 may operate as a working memory for the CPU 240. The ROM 244 stores programs executed by the CPU 240 and data required by the programs. The wireless communication device 248 may transmit and receive radio waves conforming to the IEEE 802.15.4 standard via an antenna(s). The wired communication device 252 may have a network interface conforming to the IEEE 802.3. The bus 254 interconnects the above units electrically.

With the above configuration, the control device 140 according to an embodiment of this invention may convert a signal format from the network 180 including the broadcasting device 100 and the wireless terminal 120 into another signal format which adapts to the network 190 including the management server 160. In addition, when the network 180 is a PAN formed according to the ZigBee™ standard, the control device 140 may work as the ZigBee Coordinator which manages devices in PAN.

Figure 2D:
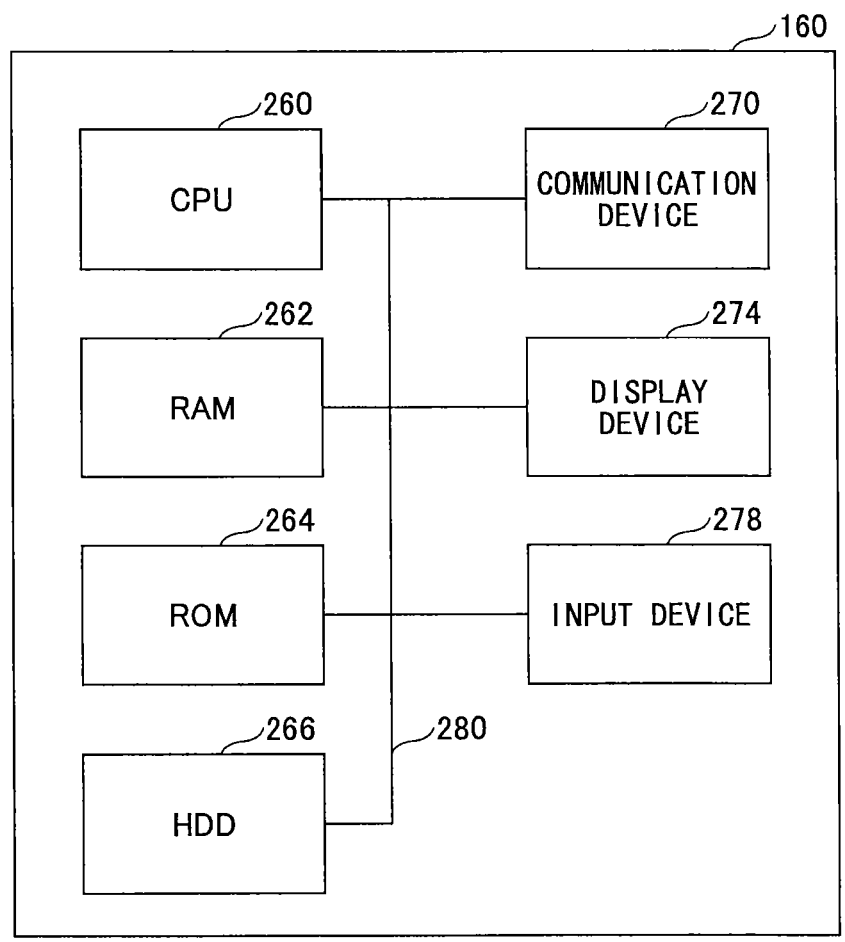
FIG. 2D is a block diagram illustrating an exemplary hardware configuration of a management server according to an embodiment of this invention.

FIG. 2D shows an exemplary hardware configuration of the management server 160 according to an embodiment of this invention. The management server 160 includes a CPU 260, a RAM 262, a ROM 264, a HDD 266, a communication device 270, a display device 274, an input device 278, and a bus 280.

The CPU 260 executes programs controlling the management server 160. The RAM 262 may operate as a working memory for the CPU 260. The ROM 262 stores programs executed by the CPU 260 and data used by the programs. The HDD 266 may store information used to manage the position of the wireless terminal 120. The communication device 270 may have a network interface conforming to the IEEE 802.3 standard. The display device 274 may be a liquid crystal display or a cathode-ray tube (CRT) display. The input device 278 may be a keyboard and/or a mouse. The bus 280 interconnects the above devices electrically.

With the above stated configuration, the management server 160 according to an embodiment of this invention may manage the position of the wireless terminal 120 and provide a search function for its position.

The HDD 266 may be various types of the storage device including a tape drive or network storage.

Alternatively, the management server 160 may have the wireless broadcasting device included in the control device 140 and work as the control device 140. Such implementation may eliminate the need for the individual control device 140.

(3. Functions)

Figures 3A, 3B:
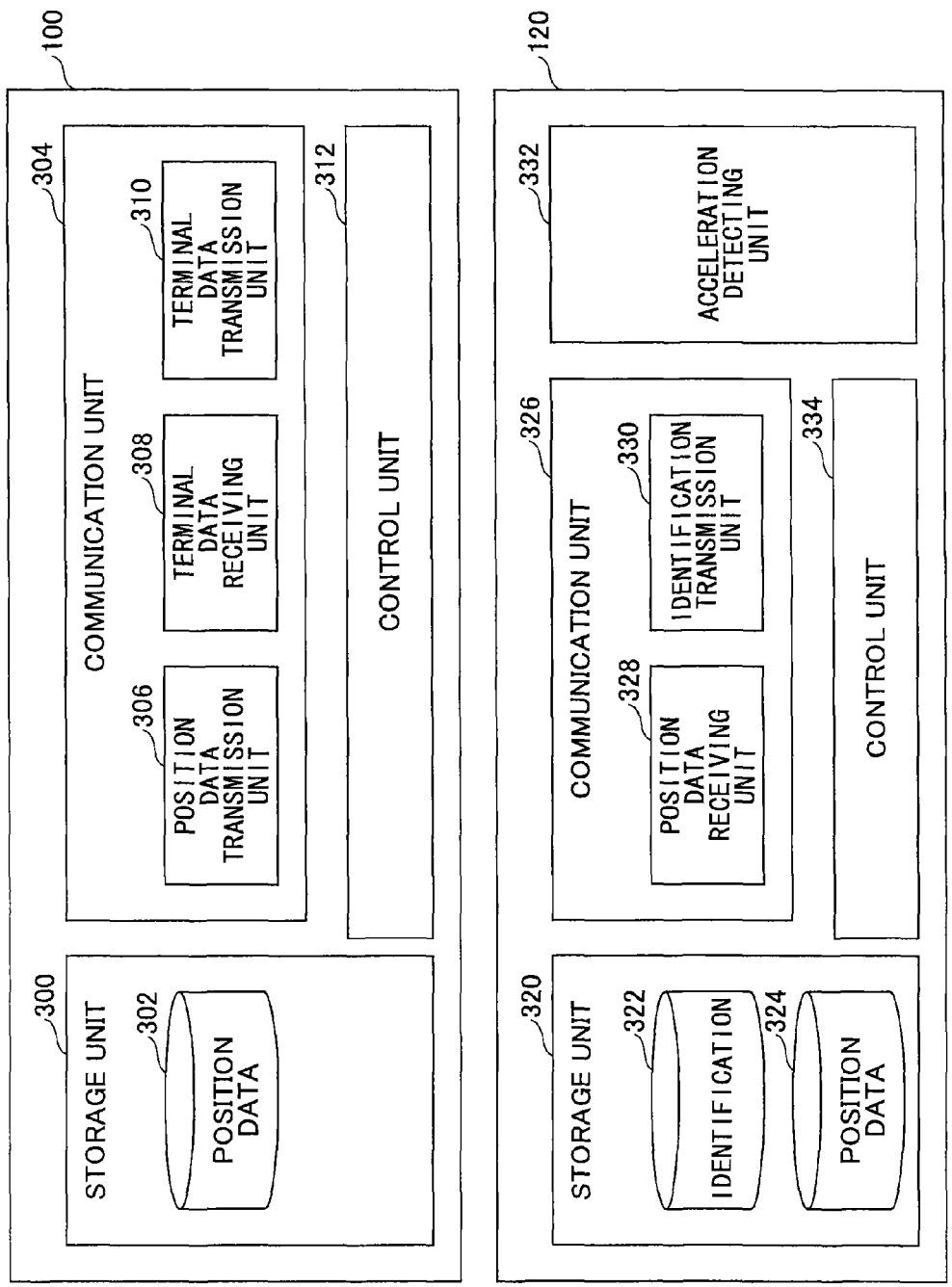
FIG. 3A is a block diagram illustrating exemplary functional configurations of a broadcasting device according to an embodiment of this invention.
FIG. 3B is a block diagram illustrating exemplary functional configurations of a wireless terminal according to an embodiment of this invention.

FIG. 3A shows the functional block diagram for the broadcasting device 100. The broadcasting device 100 includes a storage unit 300, a communication unit 304 and a control unit 312.

The storage unit 300 may store the position data 302 of the broadcasting device 100. FIG. 4 shows an example of a table for storing the position data 302. The table shown in FIG. 4 includes a floor number, degrees of latitude and longitude, and a building number. The floor number indicates the number of the floor of a building in which the broadcasting device 100 is installed. The degrees of latitude and longitude indicate the position coordinate of the location in which the broadcasting device 100 is installed. The building number indicates the number of the building in which the broadcasting device 100 is installed. In the example of FIG. 4, the broadcasting device 100 locates latitude 35.45955 north and longitude 139.387110 east on the 16th floor of a building.

The communication unit 304 includes a position data transmission unit 306, a terminal data receiving unit 308, and a terminal data transmission unit 310.

The position data transmission unit 306 may wirelessly transmit the position data 302 including degrees of latitude and longitude, a floor number, and a building number to the wireless terminal 120 in a certain area continuously or intermittently. The position data 302 may be transmitted with a format defined by the IMES format.

The terminal data receiving unit 308 may receive the identification and the position data transmitted by the wireless terminal 120.

The terminal data transmission unit 310 may transmit the identification and the position data transmitted by the wireless terminal 120 to the management server 160 via the control device 140. When the network 180 is formed according to the ZigBee™ standard, the terminal data transmission unit 310 may use routing information stored in the broadcasting device 100.

The control unit 312 may control overall operations of the broadcasting device 100. When the broadcasting device 100 forms a PAN conforming to the ZigBee™ standard along with the wireless terminal 120 and the control device 140, the control unit 312 may cause the broadcasting device 100 to work as the ZigBee Router.

With the above configuration, the broadcasting device 100 according to this embodiment may store the position data 302, transmit the position data 302 to the wireless terminal 120, receive the identification and the position data of the wireless terminal 120, and again transmit the identification and the position data to the management server 160 via the control device 140.

In addition the position data 302 may include any additional information such as the name of a building or a partition in a room. That may result in more detailed position management.

FIG. 3B shows the functional block diagram for the wireless terminal 120. The wireless terminal 120 includes a storage unit 320, a communication unit 326, an acceleration detecting unit 332, and a control unit 334.

The storage unit 320 may store and keep the identification 322 and the position data 324. The identification 322 may be data used to identify the wireless terminal 120 on the position data management system 1 such as a network address of the wireless terminal 120. For example, when the network 180 is formed according to the IEEE 802.15.4 and ZigBee™ standards, the short address in the IEEE 802.15.4 standard or the IEEE extended (MAC) address may be used as the identification 322. The position data 324 is the position data 302 transmitted from the broadcasting device 100. FIG. 5 shows an example of a table for storing the position data 324. The configuration is in common with the table shown in FIG. 4.

The communication unit 326 includes a position data receiving unit 328 and an identification transmission unit 330.

The position data receiving unit 328 may receive the position data 302 transmitted by the broadcasting device 100. The received position data 302 is stored in the storage unit 320 of the wireless terminal 120.

The identification transmission unit 330 may transmit the identification 332 and the position data 324 of the wireless terminal 120 to the broadcasting device 100. The position data 322 may be transmitted to the wireless terminal 120 by the format shown in FIG. 6. As shown in FIG. 6, fields representing a floor number, degrees of latitude and longitude, and a building number are expressed in 9 bits, 21 bits, 21 bits, and 8 bits, respectively. The fields corresponding to ones of the received IMES message are combined and form the entire format. Contents of the fields may be expressed according to the IMES standard. Also, headers and checksum digits may be added which are defined by communication methods. The communication methods may conform to the IEEE 802.15.4 and ZigBee™ standards.

The acceleration detecting unit 332 may detect a change in acceleration of the wireless terminal 120. The change may be detected at the time when the movement of the wireless terminal 120 is started or stopped, or tilted. The detected change in acceleration may be used to determine when the wireless terminal 120 performs transmission or receiving actions. The acceleration detecting unit 332 may be omitted from the wireless terminal 120.

The control unit 334 may control a timing of a receiving of the position data performed by the position data receiving unit 328 and a transmission of the identification 322 and the position data 324. The timings may be determined according to the detection by the acceleration detecting unit 332. Alternatively, the timings may be determined according to a predetermined intervals or times. In addition, timing of the receiving and the transmission may be determined independently. When the wireless terminal 120 forms a PAN along with the broadcasting device 100 and the control device 140 according to the ZigBee™ standard, the control unit 334 may cause the wireless terminal 120 to work as the ZigBee End Point.

With the above configuration, the wireless terminal 120 according to this embodiment may receive the position data and transmit the identification and the position data to the broadcasting device 100 efficiently.

When the wireless terminal 120 is a smartphone or a PC, the wireless terminal 120 may have an input unit for accepting input operations from a user and a display unit to provide information to the user. With such an implementation, the wireless terminal 120 may output the identification or the position data to the user and accept input or modification operations for the identification or the position data.

Figure 3C:
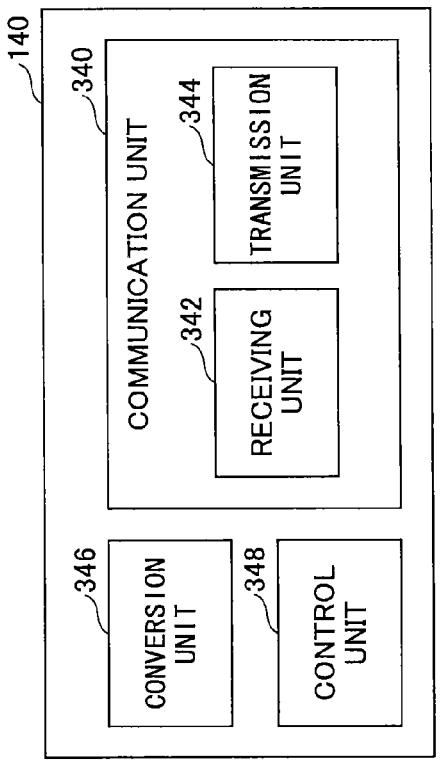
FIG. 3C is a block diagram illustrating exemplary functional configurations of a control device according to an embodiment of this invention.

FIG. 3C shows the functional block diagram for the control device 140. The control device 140 includes a communication unit 340, a conversion unit 346, and a control unit 348.

The communication unit 340 includes a receiving unit 342 and a transmission unit 344. The receiving unit 342 may receive data transmitted by the broadcasting device 100 or the wireless terminal 120 in the network 180. The transmission unit 344 may transmit the data converted in the control device 140 to the management server 160 in the network 190. The network 180 may be a PAN according to the IEEE 802.15.4 and ZigBee™ standards. The network 190 may be a LAN according to the IEEE 802.3 standard.

The conversion unit 346 may convert a format of the data which are received by the receiving unit 342 from the network 180 into another format suitable for the network 190. The transmission unit 344 may transmit the converted data to the management server 160 via the network 190. When the identification of the wireless terminal 120 included in the data is expressed by the short address for the IEEE 802.15.4 standard, the conversion unit 346 may convert the short address into the IEEE extended address based on information about the PAN configuration.

The control unit 348 may control overall actions of the control device 140. When the control device 140 forms a PAN according to the ZigBee™ standard along with the broadcasting device 100 and the wireless terminal 120, the control unit 348 may cause the control device 1400 to work as the ZigBee Coordinator.

With the above configuration, the control device 140 according to this embodiment may interconnect the network 180 including the broadcasting device 100 and the wireless terminal 120 and the network 190 including the management server 160 and may convert and relay data transmitted from the network 180 to the network 190 and vice versa.

Figure 3D:
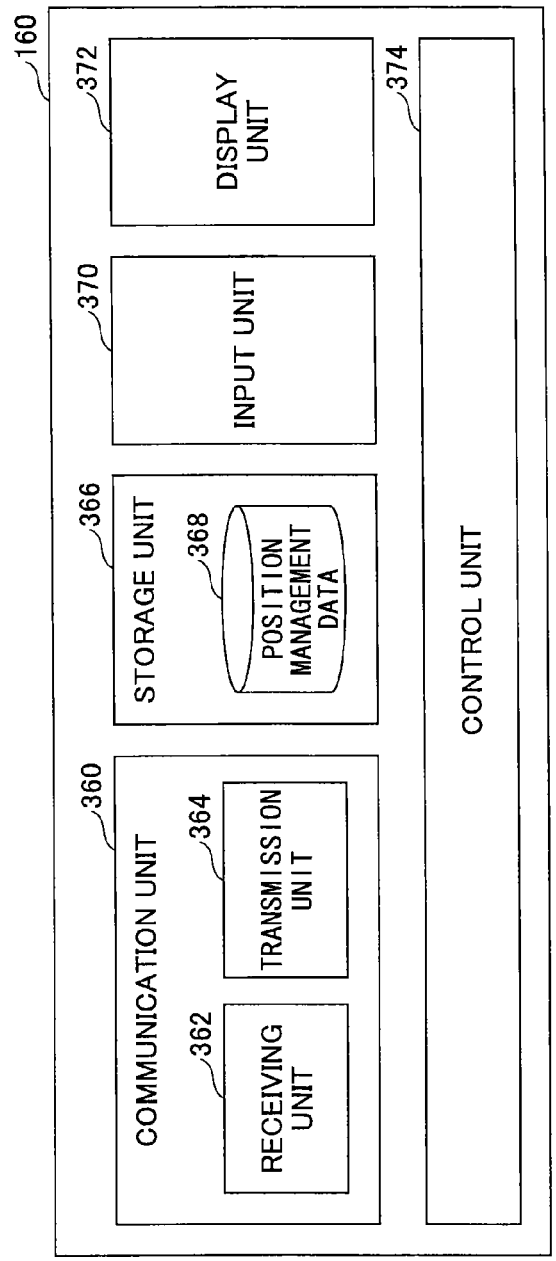
FIG. 3D is a block diagram illustrating exemplary functional configurations of a management server according to an embodiment of this invention.

FIG. 3D shows the functional block diagram for the management server 160. The management server 160 includes a communication unit 360, a storage unit 366, an input unit 370, a display unit 372 and a control unit 374.

The communication unit 360 includes a receiving unit 362 and a transmission unit 364. The receiving unit 362 may receive the identification and the position data transmitted by the wireless terminal 120 via the control device 140. The storage unit 366 may store the received identification and the position data. In response to a request for the position data from an external server, the transmission unit 364 may transmit the position data to the external server.

The storage unit 336 includes a position management data 368. The position management data 368 includes the identification and the position data received from the wireless terminal 120 as well as management data such as receipt date and time. FIG. 7 shows a table for storing the data. The table includes the identification, an object name, an owner division, latitude, longitude, a floor number, a building number, and receipt date and time. The identification may be an IEEE extended address of the wireless terminal 120 which transmits the identification. The latitude and longitude, the floor number, and the building number correspond to the position data received with the identification. The receipt date and time indicates the date and time when the management server 160 received the data. The object name indicates a name of the managed object to which the wireless terminal 120 is attached or a name of the wireless terminal 120 itself. The owner division indicates a division owning the wireless terminal 120 which transmitted the data. The object name and the owner division are associated with the identification on the management server 160 in advance.

The input unit 370 may accept input operations from a user for searching locations of the managed objects.

Figure 9B:
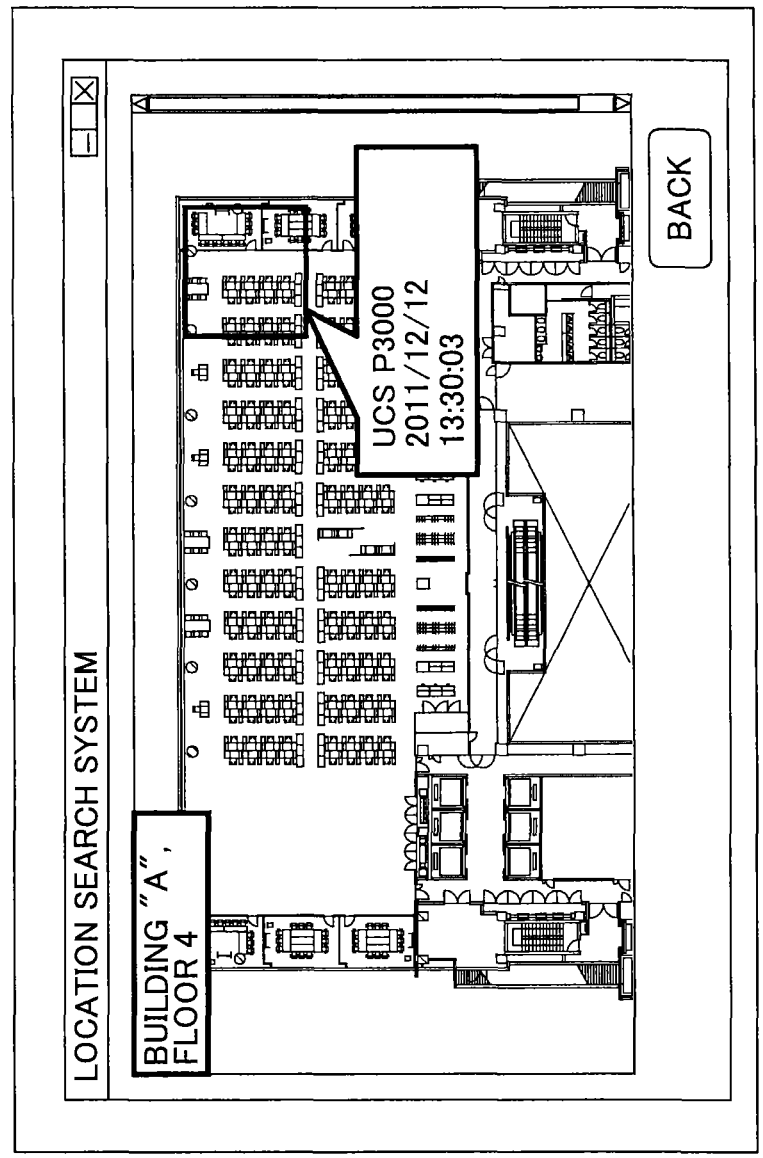
FIG. 9B is a drawing illustrating an exemplary screen for search results displayed by a management server according to an embodiment of this invention.

The display unit 372 may show a screen on the display device 274 so that the user may search locations of the managed objects with GUI. In a location search system shown in FIG. 9A, the display unit 372 may output the owner divisions and the object names of the wireless terminals based on the data stored in the storage unit 366. Checkmarks appear when the user selects checkboxes of the desired objects using the input unit 370. After the user selects the objects and pushes down the "Query" button, a search operation is executed and a screen showing the search result appears. As shown in FIG. 9A, the user searches for a managed object "UCS P3000" owned by "Business Section 1". FIG. 9B shows a screen showing its search result. When the "Query" button is pushed down, the display unit 372 displays a floor map of the "4th floor" of the "A building" where "UCS P3000" exists as well as the object name and the receipt date and time based on the data stored in the storage unit 366.

The control unit 374 may control overall actions of the management server 160.

With the above configuration, the management server 160 according to this embodiment may manage locations of the wireless terminals and provide a search function for the locations. That may advantageously reduce an amount of calculations to search the locations of the wireless terminals by managing their absolute position data.

The management server 160 may include additional units having the same function with the conversion unit 346, the control unit 348 and the receiving unit 342 of the control device 140. Such configuration may eliminate the need for installation of the control device 140.

The position management data 368 stored in the management server 160 may include transmission date and time of the data transmitted by the wireless terminal 120, identification of the broadcasting device or the control device which relay the data, duration required to reach the data from the wireless terminal 120 to the management server 160, and electric field strength measured at the wireless terminal 120. This may result in more detailed position management.

The management server 160 may store the past position data of the wireless terminal 120. That may allow for tracking the wireless terminal 120 or the managed object.

(4. Process Flow)

FIG. 8 shows a sequence chart illustrating a process performed by the position data management system 1 in the configuration shown in FIG. 1. In FIG. 8, the position data management system 1 includes the broadcasting device 100 which transmits the position data to the area in which the broadcasting device 100 exists, the wireless terminal 120 which receives the position data transmitted by the broadcasting device 100 in response to a change in acceleration and transmits the received position data and the identification to the broadcasting device 100, the control device 140 which interconnects the PAN conforming to the IEEE 802.15.4 and ZigBee™ standards and the LAN conforming to the IEEE 802.3 standard, and the management server 160. Here, the PAN including the broadcasting device 100, the wireless terminal 120, and the control device 140 has established.

In Step S800, the broadcasting device 100 continuously or intermittently transmits the position data according to the IMES standard.

In Step S802, the wireless terminal 120 detects a change in acceleration.

In Step S804, in response to the detection of the change in acceleration, the wireless terminal 120 receives the position data transmitted by the broadcasting device 100.

In Step S806, the wireless terminal 120 stores the received position data.

In Step S808, the wireless terminal 120 transmits the identification of the wireless terminal and the received position data to the broadcasting device 100.

In Step S810, the broadcasting device 100 relays the identification and the position data received from the wireless terminal 120 to the control device 140 with the shortest path.

In Step S812, the control device 140 converts a format of the data including the identification and the position data received from the broadcasting device 100 into another format suitable for the network 190.

In Step S814, the control device 140 transmits the converted identification and the position data whose formats are suitable for the network 190 to the management server 160.

In Step S816, the management server 160 stores the identification and the position data received from the control device 140 as well as the relevant data about the wireless terminal 120.

With the above process, the position data management system 1 according to this embodiment brings about an advantageous reduction of power consumed by the wireless terminal 120 since the wireless terminal 120 may transmit the identification and the position data to the nearest broadcasting device 100 efficiently.

As stated above, the management server 160 may incorporate the function of the control device 140. Such configuration may eliminate the need for installing the control device 140 separately.

When the wireless terminal does not have the acceleration detecting unit 332, Step S802 is not executed, and the receiving in Step S804 may be performed at predetermined times intervals. Subsequent steps are in common with Steps S806-S816.

(Variant)

Based on the above embodiment, a variant of the wireless terminal 120 is explained. The following description refers to a wireless terminal 120-2 as the variant of the wireless terminal 120. However, such a variation may be applied to the wireless terminal 122, 124 similarly.

(Hardware Configuration of Wireless Terminal 120-2)

Figure 10:
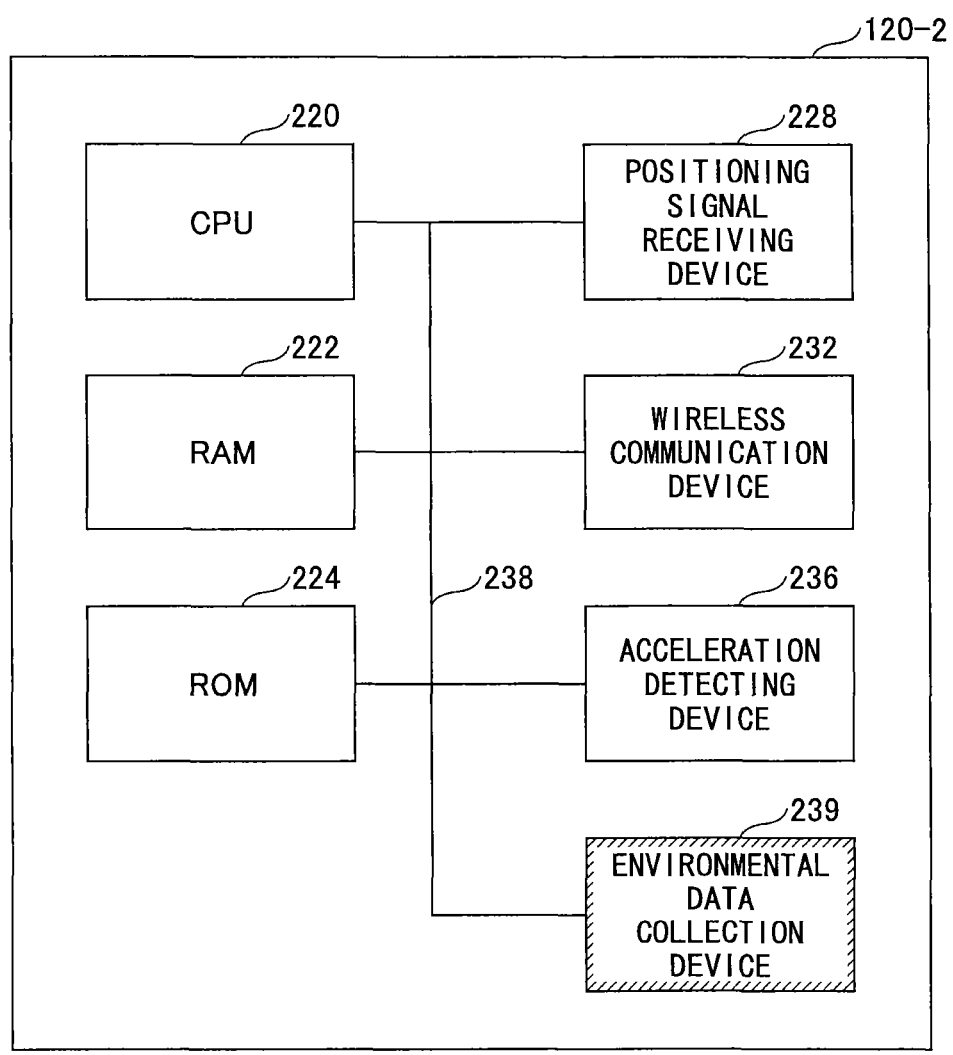
FIG. 10 is a block diagram illustrating an exemplary hardware configuration of a wireless terminal according to a variant of this invention.

FIG. 10 shows an exemplary hardware configuration of the wireless terminal 120-2 according to this variant. Compared to the configuration shown in FIG. 2B, the wireless terminal 120-2 further includes an environmental data collection device 239 in addition to the CPU 220, the RAM 222, the ROM 224, the positioning signal receiving device 228, the wireless communication device 232, the acceleration detecting device 236, and the bus 238. The following description focuses on the differences from the configuration shown in FIG. 2A.

The environmental data collection device 239 may detect an environmental value representing a state of an environment around the wireless terminal 120-2. The environmental data collection device 329 may collect the environmental value of the environment or its variation. In particular, the environmental data collection device 239 may be implemented by a temperature sensor, a humidity sensor, an illuminance sensor, an odor sensor (e.g. a gas sensor), a human-detecting sensor, a barometer, a contact sensor, a radiation sensor, an acoustic (sonic) sensor, an electromagnetic sensor, etc.

When the environmental data collection device 239 is implemented by the temperature sensor, the environmental data collection device 239 may measure the temperature in the environment of the wireless terminal 120 and obtain a temperature value.

When the environmental data collection device 239 is implemented by the humidity sensor, the environmental data collection device 239 may measure the humidity in the environment of the wireless terminal 120 and obtain a humidity value.

When the environmental data collection device 239 is implemented by the illuminance sensor, the environmental data collection device 239 may measure the illuminance in the environment of the wireless terminal 120 and obtain an illuminance value.

When the environmental data collection device 239 is implemented by the odor sensor (e.g. a gas sensor), the environmental data collection device 239 may detect the odor in the environment of the wireless terminal 120 and obtain an odor value.

When the environmental data collection device 239 is implemented by the human-detecting sensor, the environmental data collection device 239 may detect existence of a human in the environment around the wireless terminal 120 and obtain a human-detecting value (e.g. "0" indicates that no one exists, and "1" indicates that someone exists).

When the environmental data collection device 239 is implemented by the barometer, the environmental data collection device 239 may measure air pressure in the environment around the wireless terminal 120 and obtain an air pressure value.

When the environmental data collection device 239 is implemented by the contact sensor, the environmental data collection device 239 may detect existence of a contact to the wireless terminal 120 and obtain a contract value (e.g. "0" indicates that no contact is detected, and "1" indicates that the contact is detected).

When the environmental data collection device 239 is implemented by the radiation sensor, the environmental data collection device 239 may detect the radiation and obtain a radiation value.

When the environmental data collection device 239 is implemented by the acoustic (sonic) sensor, the environmental data collection device 239 may sense a sound and obtain an acoustic value.

When the environmental data collection device 239 is implemented by the electromagnetic sensor, the environmental data collection device 239 may detect an electromagnetic wave in the environment around the wireless terminal 120 and obtain an electromagnetic value.

The above sensors are merely examples. Any other sensors may be used for the wireless terminal 120. In addition, the environmental data collection device 239 may include one or more or all of the sensors described above.

(Functions of Wireless Terminal)

Figure 11:
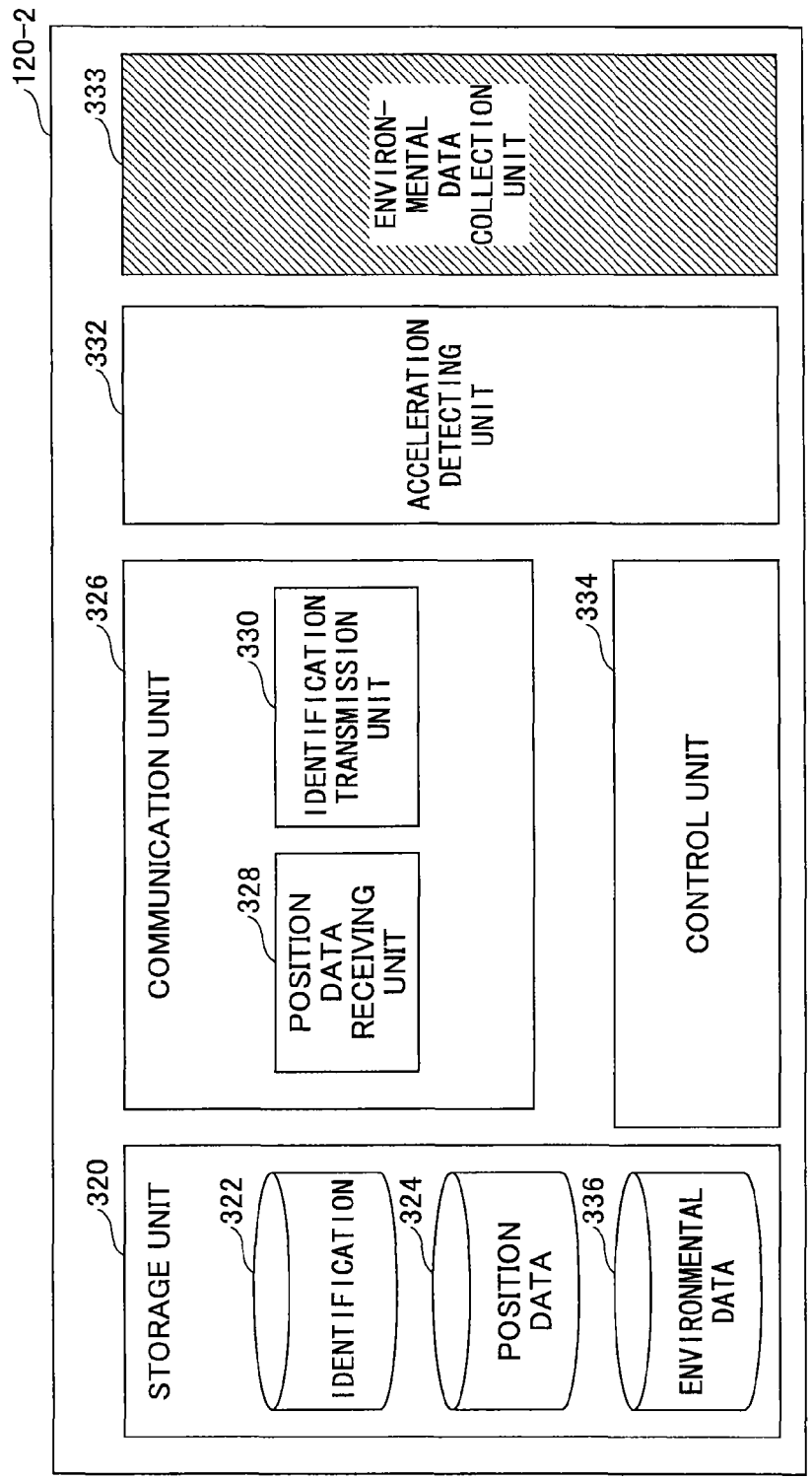
FIG. 11 is a block diagram illustrating exemplary functional configurations of a wireless terminal according to a variant of this invention.

FIG. 11 shows the functional block diagram for the wireless terminal 120-2 according to the variant. Compared to the configuration in FIG. 3B, the wireless terminal 120-2 includes an environmental data collection unit 333 in addition to the storage unit 320, the communication unit 326, the acceleration detecting unit 332, and the control unit 334. In addition, the storage unit 320 stores environmental data 336 in addition to the identification 322 and the position data 324.

The environmental data collection unit 333 may be implemented by the environmental data collection device 239, and collect environmental data representing a state of an environment at predetermined intervals. In particular, the environmental data may include the temperature value, the humidity value, the illuminance value, the odor value, the human detecting value, the air pressure value, the contact value, the radiation value, the acoustic value, and the electromagnetic value.

(Example of Environmental Data)

FIG. 12 shows an example of the environmental data 336 according to this variant. The environmental data 336 may be detected and obtained by the environmental data collection unit 333. The environmental data collection unit 333 stores the environmental data 336 in the storage unit 320 as the environmental data 336.

The environmental data 326 shown in FIG. 12 includes the temperature value, the humidity value, the illuminance value, the odor value, the human detecting value, the air pressure value, the contact value, the radiation value, the acoustic value, and the electromagnetic value which are detected and obtained by the environmental data collection unit 333. The environmental data 336 shows, in an environment around the wireless terminal 120-2, that the temperature value is 25 degrees, the humidity value is 50%, the illuminance value is 50 lx, no human detected, the air pressure value is 1020 hPa, no contact detected, the radiation value is 0.001 Sv, the acoustic value is 60 dm, and the electromagnetic value is −50 dBm.

The above values are merely examples for the environmental data 336. The number of each value may vary depending on the environmental data detected by the environmental data collection device 239. The environmental data 336 may also be called "sensed data" since the environmental data 336 is detected by the sensor.

(Example of Positional Management Data in Management Server 160)

Again referring to FIG. 3D, the storage unit 366 of the management server 160 includes the position management data 368. The position management data 368 includes the identification and position data received from the wireless terminal 120-2 and the management data such as the receipt date and time.

FIG. 13 shows an example of position management data 368-2. Comparing to the table shown in FIG. 7, the position management data 368 according to this variant includes the environmental data received from the wireless terminal 120-2 in addition to the identification, the position data, and the receipt date and time received from the wireless terminal 120-2 at predetermined intervals or times.

The management server 160 may receive the environmental data 336 from the wireless terminal 120-2 via the broadcasting device 100. The management server 160 may combine the received environmental data 336 (e.g. a temperature value, a humidity value, an illuminance value, an odor value, a human detecting value, an air pressure value, a contact value, a radiation value, an acoustic value, and an electromagnetic value) with the identification and the position data received from the wireless terminal 120-2, and the receipt date and time.

With the above configuration, the management server 160 may manage, by referring to the position management data 368-2, the environmental data around the wireless terminal 120-2 in real time (more precisely, at predetermined intervals or times) in addition to the location of the wireless terminal 120-2.

(Process Flow)

Figure 14:
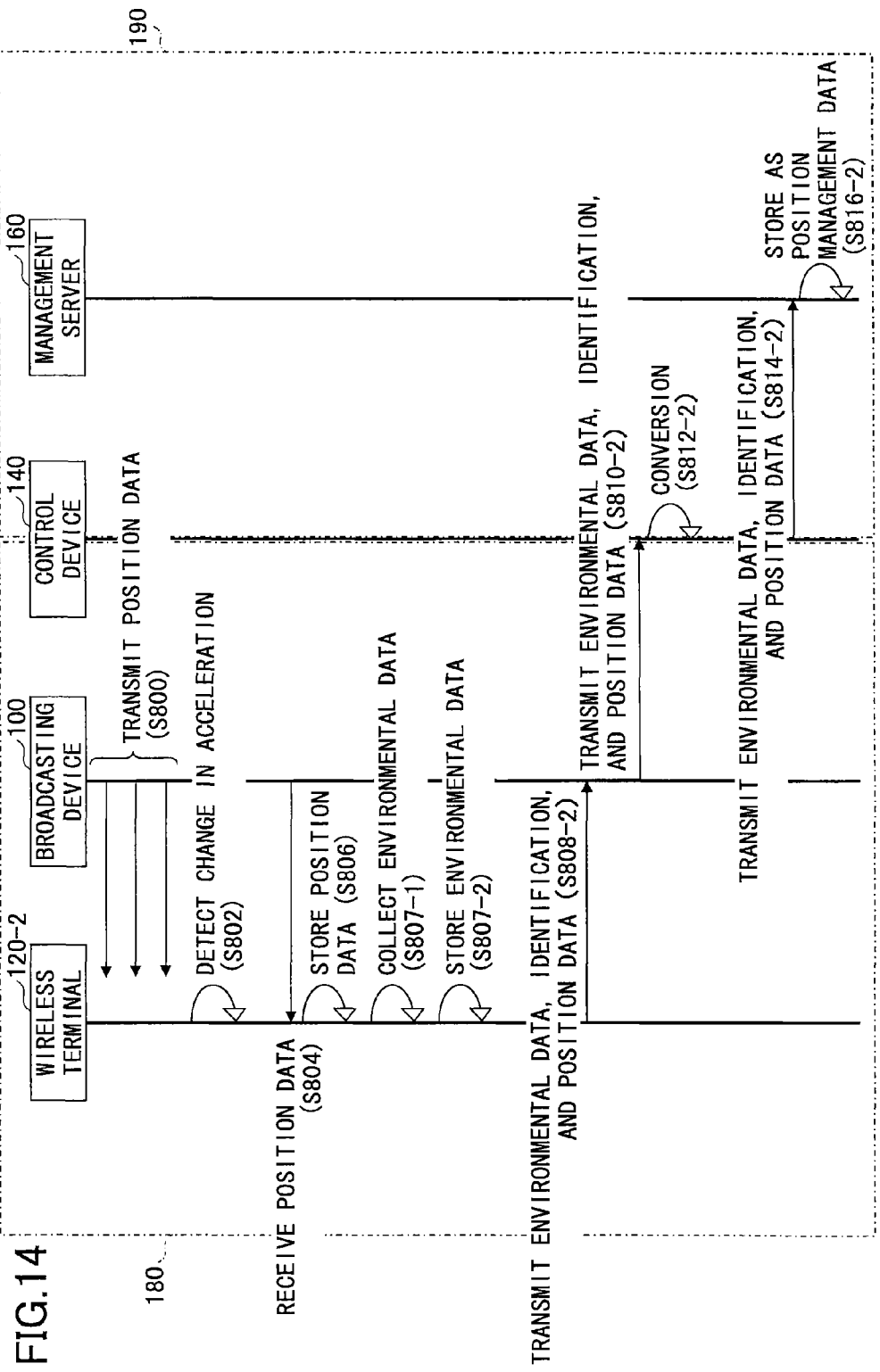
FIG. 14 is a sequence chart illustrating a process performed by a position data management system in a variant of this invention.

FIG. 14 shows a sequence chart illustrating a process performed by the position data management system 1-2 according to this variant. Comparing to the process shown in FIG. 8, in this variant, when the wireless terminal 120-2 receives the position data from the broadcasting device 100, the wireless terminal 120-2 transmits to the broadcasting device 100 the environmental data collected in the environment in addition to the received position data and identification of the wireless terminal 120-2. The steps shown in FIG. 14 performing the same processing with the steps shown in FIG. 8 have the identical numbers.

In Step S800, the broadcasting device 100 continuously or intermittently transmits the position data according to the IMES standard.

In Step S802, the wireless terminal 120-2 detects a change in acceleration.

In Step S804, in response to the detection of the change in acceleration, the wireless terminal 120-2 receives the position data transmitted by the broadcasting device 100.

In Step S806, the wireless terminal 120-2 stores the received position data.

In Step S807-1, the wireless terminal 120-2 (environmental data collection unit 333) collects the environmental data around the wireless terminal 120-2. The wireless terminal 120-2 may receive the environmental data synchronously with the receipt of the position data from the broadcasting device 100. That allows the wireless terminal 120-2 to transmit the environmental data along with the position data to be transmitted to the broadcasting device 100.

In Step S807-2, the wireless terminal 120-2 stores the environmental data around the environment as the environmental data 336 (See FIG. 12).

In Step S808-2, the wireless terminal 120-2 transmits to the broadcasting device 100 the environmental data 336 as well as the identification of the wireless terminal 120-2 and the received position data.

In Step S810-2, the broadcasting device 100 relays the environmental data 336 in addition to the identification and the position data received from the wireless terminal 120 to the control device 140 with the shortest path.

In Step S812-2, the control device 140 converts a format of the data including the environmental data 336 in addition to the identification and the position data received from the broadcasting device 100 into another format suitable for the network 190.

In Step S814-2, the control device 140 transmits the converted identification and the position data whose formats are suitable for the network 190 to the management server 160.

In Step S816-2, the management server 160 stores the environmental data 336 in addition to the identification and the position data received from the control device 140 as well as the relevant data about the wireless terminal 120-2 (See FIG. 13).

With the above process, the position data management system 1-2 according to this variant brings about an advantageous reduction of power consumed by the wireless terminal 120-2 since the wireless terminal 120 may transmit the environmental data, the identification, and the position data to the nearest broadcasting device 100 efficiently. In addition, based on the received environmental data, the management server 160 may manage the environmental data (value) around the wireless terminal 120-2 together with the position data of the wireless terminal 120-2.

(Use Case of Environmental Data)

As discussed above, the management server 160 according to this variant may manage the environmental data around the position specified by the position data of the wireless terminal 120-2 as well as the position data of the wireless terminal 120-2. Thus, the management server 160 may control, based on the environmental data 336, various types of controlled apparatuses via a network. Example use cases are discussed below.

Figure 15:
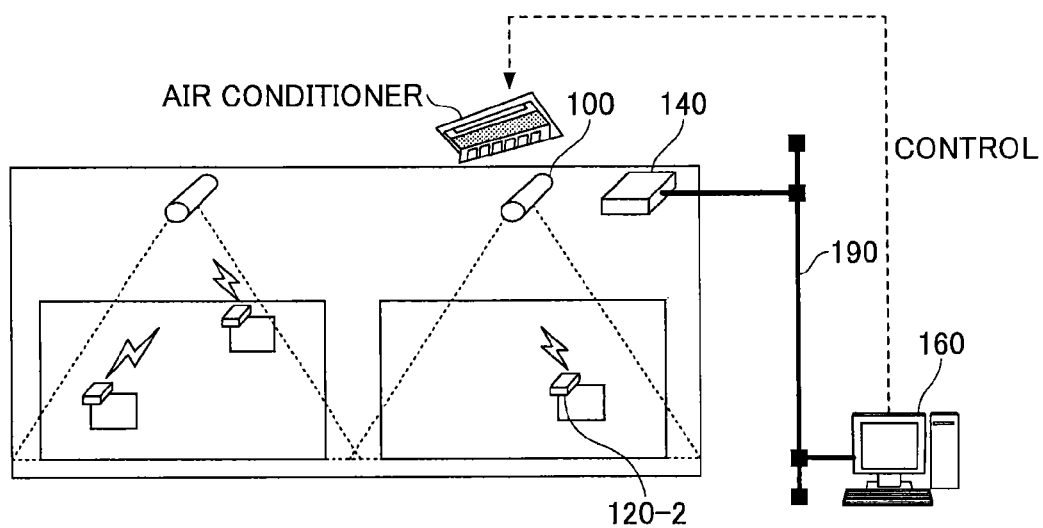
FIG. 15 is a drawing illustrating an example (first example) of a control for a controlled device in a variant of this invention.

FIG. 15 shows a first example of the control for the controlled apparatus in this variant. As shown in FIG. 15, when the management server 160 determines that the temperature value is improper at the position specified by the position data of the wireless terminal 120-2, the management server 160 may transmit to an air conditioning apparatus (or an air control system) as the controlled apparatus an instruction to control it so as to adapt the temperature value at the position to a proper value.

In addition, when the management server 160 determines that the humidity value is improper at the position specified by the position data of the wireless terminal 120-2, the management server 160 may transmit to an air conditioning system (not illustrated) as the controlled apparatus an instruction to control it so as to adapt the humidity value at the position to a proper value.

In addition, when the management server 160 determines that the illuminance value is improper (invalid) at the position specified by the position data of the wireless terminal 120-2, the management server 160 may transmit to a light management system (not illustrated) as the controlled apparatus an instruction to control it so as to adapt the illuminance value at the position to a proper value.

In addition, when the management server 160 determines that the odor value is improper (abnormal) at the position specified by the position data of the wireless terminal 120-2 (e.g. a construction site or a laboratory), the management server 160 may transmit to a air conditioning system or a ventilation system (not illustrated) as the controlled apparatus an instruction to control it so as to adapt the odor value at the position to a proper value.

In addition, when the management server 160 determines that existence of a human is detected at the position specified by the position data of the wireless terminal 120-2 (e.g. a roped-off area), the management server 160 may transmit to a security system (not illustrated) as the controlled apparatus an instruction to control it so as to enable a safeguard or raise an alarm or alert at the position.

In addition, when the management server 160 determines that the air pressure value is improper (abnormal) at the position specified by the position data of the wireless terminal 120-2 (e.g. a construction site or a laboratory), the management server 160 may transmit to a air pressure management system (not illustrated) as the controlled apparatus an instruction to control it so as to adapt the air pressure value at the position to a proper value.

In addition, when the management server 160 determines that a contact is detected at the position specified by the position data of the wireless terminal 120-2 (e.g. a roped-off area), the management server 160 may transmit to a security system (not illustrated) as the controlled apparatus an instruction to control it so as to enable a safeguard or raise an alarm or alert at the position.

In addition, when the management server 160 determines that the radiation value is improper (abnormal) at the position specified by the position data of the wireless terminal 120-2 (e.g. a construction site or a laboratory), the management server 160 may transmit to a security system (not illustrated) as the controlled apparatus an instruction to control it so as to enable a safeguard or raise an alarm or alert at the position.

In addition, when the management server 160 determines that the acoustic value (i.e. a volume) is improper (e.g. the sound is noisy) at the position specified by the position data of the wireless terminal 120-2 (e.g. a construction site or a laboratory), the management server 160 may transmit to a security system (not illustrated) as the controlled apparatus an instruction to control it so as to raise an alarm or alert or an improvement instruction at the position.

In addition, when the management server 160 determines that the electromagnetic value is improper (e.g. abnormal) at the position specified by the position data of the wireless terminal 120-2, the management server 160 may transmit to a security system (not illustrated) as the controlled apparatus an instruction to control it so as to enable a safeguard or raise an alarm or alert at the position.

Furthermore, when the wireless terminal 120-2 is attached to an arm of a patient and the environmental data collection device 239 of the wireless terminal 120-2 is a pulse monitor, the environmental data collection device 239 may obtain a pulse rate from the arm of the patient. When the management server 160 determines that the pulse rate is improper (e.g. abnormal) at the position specified by the position data of the wireless terminal 120-2, the management server 160 may transmit to a medical care system (not illustrated) as the controlled apparatus an instruction to control it so as to send a notification indicating the name of the patient, the position and the detection of the improper rate to a medical personnel.

Beside the above configuration, the wireless terminal 120-2 may be placed on or in the water. In that case, the environmental data collection device 239 may be a flow rate sensor. The environmental data collection device 239 of the wireless terminal 120-2 may measure a water or air flow rate around the wireless terminal 120-2 and obtain the flow rate (m/s). When the management server 160 determines that the flow rate is improper (e.g. abnormal) at the position specified by the position data of the wireless terminal 120-2, the management server 160 may transmit to a security system (not illustrated) as the controlled apparatus an instruction to control it so as to enable a safeguard or raise an alarm or alert at the position.

Beside the above configuration in which the wireless terminal 120 is install independently, the wireless terminal 120-2 may be attached to an electrical apparatus or a power strip. In that case, the environmental data collection device 239 may be a power sensor. The environmental data collection device 239 may measure power consumption on the electrical apparatus or the power strip to which the wireless terminal 120 is attached and obtain wattage (W). When the management server 160 determines that the wattage is improper (e.g. abnormal) at the position specified by the position data of the wireless terminal 120-2, the management server 160 may transmit to a device management system (not illustrated) as the controlled apparatus an instruction to control it so as to enable a safeguard or raise an alarm or alert at the position.

Figure 16:
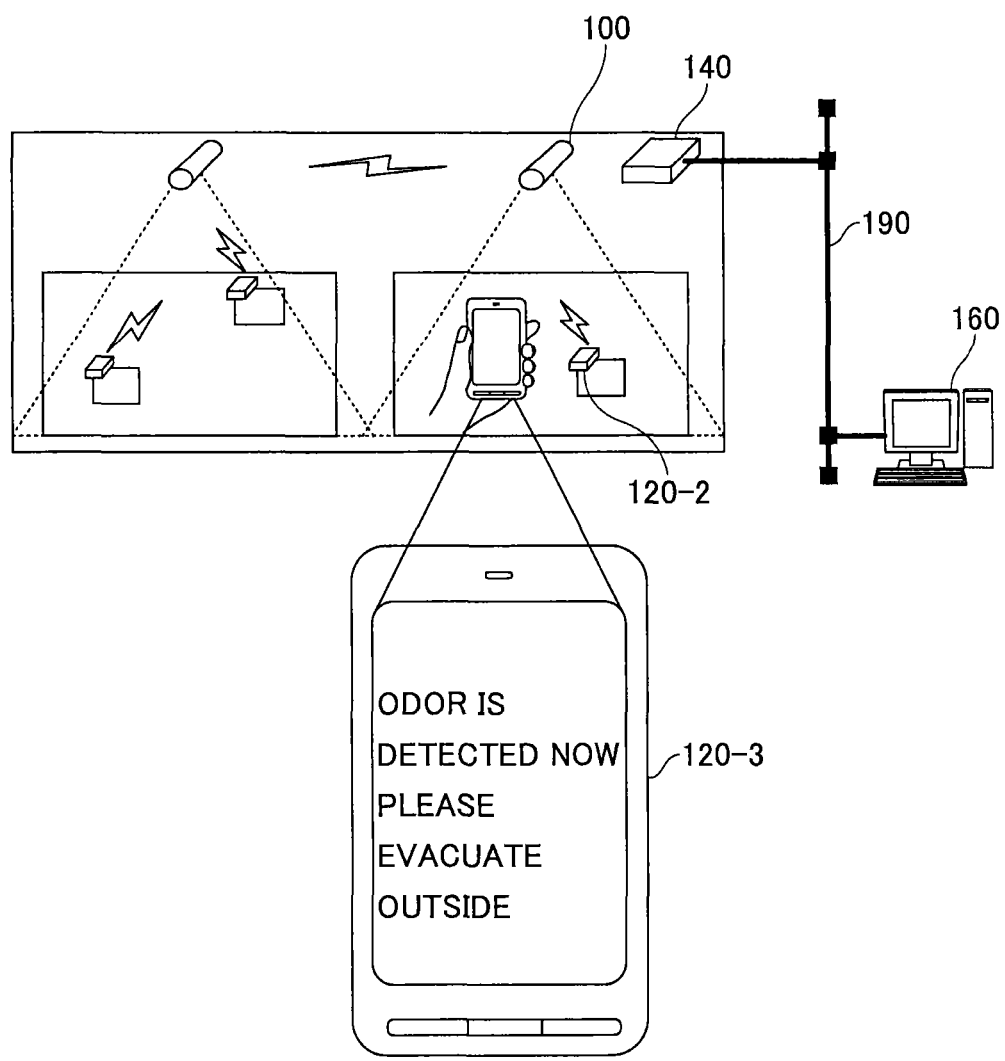
FIG. 16 is a drawing illustrating an example (second example) of a control for a controlled device in a variant of this invention.

Further use cases may be expected. FIG. 16 shows a second example of the control for the controlled apparatus in this variant. As stated above, the wireless terminal 120-2 may not be the active tag itself but a mobile terminal 120-3, such as a smartphone, a PDA, a PC or a smart indicator, which has the same functions with the active tag. This configuration allows the management server 160 to manage position data indicating a position where the mobile terminal exists without attaching the active tab to a managed object.

Since the mobile terminal 120-3 has the environmental data collection unit 333, the mobile terminal 120-3 may collect the environmental data (e.g. S807-1 in FIG. 14). In addition, since the mobile terminal 120-3 normally has a display, the mobile terminal 120-3 may display the collected environmental data. That configuration allows a user of the mobile terminal 120-3 to check and manage the environmental data around the user using the mobile terminal 120-3.

If the mobile terminal does not have the environmental data collection unit 330 (i.e. does not have any sensor), the mobile terminal may operate as the sensorless wireless terminal 120. Such a mobile terminal 120-4 may the position data received from the broadcasting device 100 and the identification of the mobile terminal 120-4 to the broadcasting device 100. The position data and the identification are conveyed to the management server 160.

The management server 160 may compare the position data of the mobile terminal 120-4 and the position data of the wireless terminal 120-2 having the environmental data collection unit 333. When both of the position data indicate the same position, the management server 160 determines that the mobile terminal 120-4 is located at the position specified by the wireless terminal 120-2. The management server 160 may transmit to the mobile terminal 120-4 the environmental data 336 obtained by the wireless terminal 120-2 and allow a display unit of mobile terminal 120-4 to display the environmental data 336. With the configuration, even if the mobile terminal 120-4 does not have the environmental data collection unit 333, the user may understand and manage the environment around the user using the mobile terminal 120-4.

In addition, the management server 160 may allow the mobile terminal 120-4 to display the environmental data 336 only if the value indicated in the environmental data 336 equals a threshold value or is lower/higher. Because it may be an urgent situation to send a notification to the user when the value exceeds or falls below the threshold.

The wireless terminal 120-2 in this variant may collect the environmental value about the state of the environment around the wireless terminal 120-2 and transmit the environmental data 336 in addition to the position data received from the broadcasting device 100 and the identification of the wireless terminal 120-2.

The management server 160 may manage, by refereeing to the position management data 368-2 including the environmental data 336, the environmental value about the environment around the wireless terminal 120-2 in addition to the position of the wireless terminal 120-2 in real-time (more precisely, at predetermined intervals or times). Since the wireless terminal 120-2 may be implemented by the active tab, the user may manage the environment as well as the position of the managed object by attaching the active tag to the managed object.

In addition, since the management server 160 in this variant may manage the position data of the wireless terminal 120-2 as well as the environment at the position specified by the position data of the wireless terminal 120-2, the management server 160 may control various kinds of the controlled apparatuses via a network based on the environmental data 336 of the wireless terminal 120-2.

CONCLUSION

According to this embodiment, the position data management system may be provided to manage the position data effectively. It should be appreciated that this invention is not limited to any particular embodiments, and it is recognized that various modifications are possible within the scope of the claims.

The present application is based upon and claims the benefit of priority of Japanese Patent Application No. 2012-200642 filed on Sep. 12, 2012, and Japanese Patent Application No. 2013-182176 filed on Sep. 3, 2013, the entire contents of which are incorporated herein by reference.

PATENT DOCUMENT

[Patent Document 1] Japanese Laid-open Patent Publication No. 2012-098901

What is claimed is:

1. An information management system comprising:
a wireless terminal configured to store identification data of the wireless terminal used to identify the wireless terminal in the information management system;
a broadcasting device configured to transmit first position data which represents a position at which the broadcasting device is located for a predetermined area; and
a management server configured to store second position data indicating a position at which the wireless terminal is located,
wherein the wireless terminal includes:
an environmental data collection unit configured to collect environmental data which represents a state of an environment around the wireless terminal;
a first position data receiving unit configured to receive the first position data from the broadcasting device when the wireless terminal is located in the predetermined area; and
a first terminal data transmission unit configured to transmit, via the broadcasting device, to the management server, the identification of the wireless terminal, the first position data received from the broadcasting device, and the environmental data collected by the environmental data collection unit.

2. The information management system as claimed in claim 1, wherein the broadcasting device includes:
a first terminal data receiving unit configured to receive, from the first terminal data transmission unit the identification, the first position data, and the environmental data; and
a second terminal data transmission unit configured to transmit to the management server, the identification, the first position data, and the environmental data received by the first terminal data receiving unit, and
wherein the management server includes:

a second terminal data receiving unit configured to receive, from the second terminal data transmission unit, the identification, the first position data, and the environmental data; and a managing unit configured to manage the position at which the wireless terminal is located based on the identification and the first position data received by the second terminal data receiving unit, and manage the state of the environment around the wireless terminal based on the environmental data received by the second terminal data receiving unit.

3. The information management system as claimed in claim 1, wherein the wireless terminal further includes a display configured to output the environmental data on a screen.

4. The information management system as claimed in claim 2, further comprising a mobile terminal, wherein the mobile terminal includes:

a second position data receiving unit configured to receive from the broadcasting device third position data;

a third terminal data transmission unit configured to transmit to the management server identification data used to identify the mobile terminal in the information management system and the third position data received from the broadcasting device; and a display configured to output the environmental data on a screen, and wherein the management server includes an environmental data transmission unit configured to transmit to the mobile terminal the environmental data when both the third position data transmitted by the mobile terminal and the first position data transmitted by the wireless terminal represent a same position.

5. The information management system as claimed in claim 2, further comprising a controlled apparatus, wherein the management server includes a control unit configured to control the controlled apparatus according to a predetermined rule when a value represented by the environmental data equals, exceeds, or falls below a threshold value.

6. The information management system as claimed in claim 1, wherein the environmental data collection unit is configured to collect the environmental data, which represents at least one of a temperature value, a humidity value, an illuminance value, an odor value, a human detecting value, an air pressure value, a contact value, a radiation value, an acoustic value, an electromagnetic value, a pulse rate, a flow rate, and a wattage value.

7. A wireless terminal which communicates with a broadcasting device transmitting position data, which represents a position at which the broadcasting device is located for a predetermined area, the wireless terminal storing identification data used to identify the wireless terminal, the wireless terminal comprising:

an environmental data collection unit configured to collect environmental data which represents a state of an environment around the wireless terminal;

a position data receiving unit configured to receive the position data from the broadcasting device when the wireless terminal is located in the predetermined area; and a terminal data transmission unit configured to transmit, via the broadcasting device, to a management server, the identification of the wireless terminal, the position data received from the broadcasting device, and the environmental data collected by the environmental data collection unit.

8. A management method executed on a wireless terminal in an information management system including (1) the wireless terminal, which stores identification data used to identify the wireless terminal in the information management system, (2) a broadcasting device transmitting first position data that represents a position at which the broadcasting device is located for a predetermined area, and (3) a management server storing second position data indicating a position at which the wireless terminal is located, the method comprising:

collecting environmental data, which represents a state of an environment around the wireless terminal;

receiving the first position data from the broadcasting device when the wireless terminal is located in the predetermined area; and transmitting, via the broadcasting device, to the management server, the identification of the wireless terminal, the first position data received from the broadcasting device, and the environmental data collected in the collecting.

* * * * *